United States Patent [19]

Matsunaga et al.

[11] Patent Number: 5,557,794
[45] Date of Patent: *Sep. 17, 1996

[54] DATA MANAGEMENT SYSTEM FOR A PERSONAL DATA BASE

[75] Inventors: Yoshifumi Matsunaga; Tadanobu Miyauchi; Juhei Nakagaki, all of Yokohama, Japan

[73] Assignee: Fuji Xerox Co., Ltd., Japan

[*] Notice: The term of this patent shall not extend beyond the expiration date of Pat. No. 5,418,946.

[21] Appl. No.: 425,352

[22] Filed: Apr. 9, 1995

Related U.S. Application Data

[63] Continuation of Ser. No. 939,085, Sep. 2, 1992, abandoned.

[30] Foreign Application Priority Data

Sep. 2, 1991 [JP] Japan .................................. 3-221850
Sep. 6, 1991 [JP] Japan .................................. 3-227417

[51] Int. Cl.⁶ .................................................. G06F 17/30
[52] U.S. Cl. ................ 395/600; 364/222.81; 364/225.4; 364/282.1; 364/283.1; 364/283.2; 364/283.3; 364/419.07; 364/419.11
[58] Field of Search ........................... 395/600, 157–161, 395/419.19, 152; 364/419.19, 419.07, 419.11

[56] References Cited

U.S. PATENT DOCUMENTS

| | | | |
|---|---|---|---|
| 4,358,824 | 11/1982 | Glickman et al. | 364/DIG. 1 |
| 5,097,411 | 3/1992 | Doyle et al. | 395/600 |
| 5,119,476 | 6/1992 | Texier | 395/157 |
| 5,168,565 | 12/1992 | Morita | 395/600 |
| 5,226,117 | 7/1993 | Miklos | 395/157 |
| 5,241,671 | 8/1993 | Reed et al. | 395/600 |
| 5,309,359 | 5/1994 | Katz et al. | 364/419.19 |
| 5,325,478 | 6/1994 | Shelton et al. | 395/148 |

FOREIGN PATENT DOCUMENTS

| | | |
|---|---|---|
| 59-870 | 1/1984 | Japan . |
| 62-4749 | 1/1987 | Japan . |
| 2-93742 | 4/1990 | Japan . |

OTHER PUBLICATIONS

"The Paperless Office", Richard G. Ensman, Jr.; Modern Office Technology V32, N4, p. 56(3); Apr., 1987.
"Database Management Systems for documents", Effy Oz, Information Executive, v3, N1, p. 19(5); Winter, 1990.
Goldberg, Adele; Robson, David; Smalltalk–80: The Language and Its Implementation; 1983.
Yamamoto et al.: A Tool for Construction of Personal Database: TRIAS; Journal of Information Processing Society of Japan, Jun. 6, 1989, vol. 30, No. 6.
Ozawa et al.: KIDS: A User Interface System for the Electronic Dictionary; Journal of Human Interface Research Group in Information Processing Society of Japan, 32–1, Sep. 12, 1990.

*Primary Examiner*—Thomas G. Black
*Assistant Examiner*—Hosain T. Alam
*Attorney, Agent, or Firm*—Welsh & Katz, Ltd.

[57] ABSTRACT

A data management system in which a plurality of data each data comprising a set of three elements: a data name, a data body and a data retrieving keyword group whose content is not so described that the system is able to handle hierarchically and logically differentiating it and display areas of a data retrieval/display window or an editing window are arranged to manage data based on the above three sets. A data name can be automatically set as a retrieval key at the time of data editing. The system can handle a title or an index attached to each data of a data base, a character string corresponding to the title or index or a retrieval keyword as same with other data or an independent accessible manner. Further, the system creates another display area different in size from a display area for display of the retrieved data to display the same data as displayed on the display area for the retrieved data. The system comprises a new data retriever creating unit for integrating more than one data displayed on one or more display areas to create a new data retriever to allow easy creation of such a new data source as the data retriever on the basis of data extracted from a data retriever.

13 Claims, 34 Drawing Sheets

| | | | |
|---|---|---|---|
| THE DIET BUILDING | CITY OF MORE THAN A MILLION PEOPLE | CAPITAL | POLLUTION |
| RICE-BALL | RICE-CRACKER | ASAKUSA | UENO |
| THICK SOY SAUCE | SHINKANSEN LINE | JR | COSMOPOLITAN CITY |
| YOKOHAMA | | | |

FIG.17

| NAME | DATA |
|---|---|
| ⋮ | ... |
| alter | ［他］① 変える, 改める.<br>［自］① 変わる, 改まる.<br>＜類義語＞<br>　change, convert, shift, switch |
| ⋮ | ... |
| change | ［他］① 変える, 取り替える, 着替える; 乗り換える.<br>▶change oneself into〜, 1 ･･･ に化ける.<br>②両替する, (小切手などを)現金にする.<br>［自］① 変わる, 変化する.<br>▶change for the better(worse), 1 よく(悪く)なる.<br>▶change into〜, 1 ･･･ に変わる.<br>［名］① 変化; 変更; 乗り換え; 小銭, 釣り銭.<br>＜類義語＞<br>　alter, convert, shift, switch |
| ⋮ | ... |
| convert | ［他］① 変える.<br>②転向させる(ある信仰・主義からほかの信仰・主義に変える).<br>③(同じ金額のものに)変える, 換金する.<br>［名］① 改宗者, 転向者.<br>＜類義語＞<br>　alter, change, shift, switch |
| ⋮ | ... |
| shift | ［他］①(人・位置を)変える, 置き換える, 移す, 転ずる.<br>［自］① 移る, 変わる. ②やりくりする.<br>［名］① 変化, 変更; 交替; やりくり, 工面.<br>▶for a shift, 1 当座のしのぎに.<br>▶make(a) shift, 1 なんとかその場を切り抜ける.<br>▶night shift, 1 夜勤.<br>＜類義語＞<br>　alter, change, convert, switch |
| shiftily | ［副］① うまくやりくりして; ずるく, ごまかして. |
| shiftiness | ［名］① うまいやりくり; ずるさ, ごまかし. |
| shiftless | ［形］① やる気のない; 無策な; 無能の. |
| shiftlessly | ［副］① ふがいなく, 無策に. |
| ⋮ | ... |
| switch | ［他自］① スイッチをひねる; (話題などを)変える; (列車を)転てつする.<br>［名］① 電気のスイッチ.<br>②(汽車の線路の)転てつ機<br>③むち(の一振り).<br>＜類義語＞<br>　alter, change, convert, shift |
| ⋮ | ... |

FIG. 21

| NAME | DATA |
|---|---|
| alter | [他] ① 変える, 改める.<br>[自] ① 変わる, 改まる.<br><類義語><br>change, convert, shift, switch |
| change | [他] ① 変える, 取り替える, 着替える; 乗り換える.<br>▶change oneself into～, ↑……に化ける<br>② 両替する, (小切手などを)現金にする.<br>[自] ① 変わる, 変化する.<br>▶change for the better(worse), ↑よく(悪く)なる<br>▶change into～, ↑……に変わる.<br>[名] ① 変化; 変更; 乗り換え; 小銭, 釣り銭.<br><類義語><br>alter, convert, shift, switch |
| convert | [他] ① 変える.<br>② 転向させる(ある信仰・主義からほかの信仰・主義に変える).<br>③ (同じ金額のものに)変える, 換金する.<br>[名] ① 改宗者, 転向者.<br><類義語><br>alter, change, shift, switch |
| shift | [他] ① (人・位置を)変える, 置き換える, 移す, 転ずる.<br>[自] ① 移る, 変わる. ② やりくりする.<br>[名] ① 変化, 変更; 交替; やりくり, 工面<br>▶for a shift, ↑当座のしのぎに<br>▶make (a) shift, ↑なんとかその場を切り抜ける.<br>▶night shift, ↑夜勤<br><類義語><br>alter, change, convert, switch |
| switch | [他自] ① スイッチをひねる; (話題などを)変える; (列車を)転てつする.<br>[名] ① 電気のスイッチ<br>② (汽車の線路の)転てつ機.<br>③ むち(の一振り).<br><類義語><br>alter, change, convert, shift |

FIG. 35

DATA MANAGEMENT SYSTEM FOR A PERSONAL DATA BASE

This is a continuation of application Ser. No. 07/939,058 filed Sep. 2, 1992, now abandoned.

BACKGROUND OF THE INVENTION

1. Field of the Invention

The present invention relates to a data management system which performs editing operations including retrieving, adding, deleting, modifying and registering operations of data in a data base.

2. Description of the Related Art

When it is desired to create a personal data base with use of a data base program comprising records each having a plurality of fields, conventionally, a user defines attributes corresponding to such fields as name, postal number, address, and telephone number and then enters them on a case basis. This method has such a merit that, since each case is divided into such attributes, even when the user wishes such a complicated request that it is desired to create, e.g., a list of only names and telephone numbers, the data base can easily cope with it.

However, when it is desired to add items of birthday and occupation as an additional data to the list in the course of creating the list, it becomes necessary to re-create the data base from the beginning, which imposes a great deal of burden on the user. In other words, with respect to such data that attribute items per se are modified, the flexibility of the data base itself becomes vital.

Meanwhile, Japanese Patent Application Laid-Open No. 2-93742 discloses a technique in which a plurality of data base definers are provided in a data base. However, in this technique, a user must re-define each definer independently and no consideration is paid to modification of the definer itself.

Recently, in addition to data such as an address book, a stock list and an achievement table usually managed in offices or companies, various sorts of data such as literature data, dictionaries and newspaper articles have been increasingly handled. The prior art data base, however, has not have a framing function of integrally managing such various sorts of data.

For this reason, the user must re-define the management framing every time and the data base can merely have an ability of defining the framing.

In this way, the once defined framing imposes restrictions on data to be handled, thus making it difficult to absorb the data diversification. In other words, if such data to be frequently modified as mentioned earlier is to be dealt with time, then the problem talking here is that various sorts of data cannot be handled by single framing when time is fixed.

For example, in a programming language known as 'Smalltalk-80', it is necessary to define a class of a new object each time by setting its instance variable or the like, which results in that it is difficult to generate all necessary objects in one class definition (refer to a reference book entitled "SMALLTALK-80: The Language And its Implementation" by Adele Goldberg, David Robson, Addison Wesley).

Meanwhile, when a data base has a very high function, the possibility of being able to cope with diversified applications becomes high; whereas, the data base becomes complicated in handling, thus resulting in that ordinary users cannot use it easily. The aforementioned re-definition problem also leads to the fact that the user interface becomes complex. Thus, in the case of such a data base, it is difficult for ordinary users who are not experts to readily have a good command of the data base.

There has been proposed a personal easy data base in which, as disclosed in a paper entitled "A Tool for Construction of Personal Database: TRIAS" (Journal of Information Processing Society of Japan, Jun. 6, 1989, Vol. 30, No. 6), one unit of data is managed in the form of a set of 3 of entity, attribute and value for easy human understanding, but no reference is made to user interface itself.

Further, in a paper entitled "KIDS: A User Interface System for the Electronic Dictionary" (Journal of Human Interface Research Group in Information Processing Society of Japan, 32-1, Sep. 12, 1990) regarding research of electronic dictionary user interface, there is stated that though flexibility is emphasized too much but a problem of user's understandability and convenience of the user interface still remain not solved. In a paper entitled "User Interface for CD-ROM Retriever" reported in Proceedings of the 42th General Meeting of the Information Processing Society of Japan, 1L-5, an input window, a control panel, a candidate window and a data body window are provided as basic windows for retrieval for the purpose of obtaining a higher convenience, but this is generalized for retrieval of the Kojien CD-ROM and no special consideration is paid to a relationship between its configuration and actual data unit structure. In particular, when such a function as addition, deletion, modification or registration is applied, the user interface becomes further complicated, which is still a problem to users who wants to perform editing operation.

In this way, there have been proposed various sorts of data bases including a personal card type data base and data bases which can be used on personal computers. However, no considerations have been given to such data of which attributes are frequently modified or to the variety of data. Further, in order to fully utilize these systems, it is required to study for their operations, and previous classification and re-arrangement of data to be stored are required.

These years, there has been developed a data retriever which converts language data into electronic data, stores the electronic data and retrieves data through various sorts of interfaces, a typical example of which is known as such an electronic dictionary capable of electronically retrieving desired data as an English-Japanese dictionary, a Japanese-English dictionary or an encyclopedia.

An electronic dictionary disclosed in the Japanese Patent Publication No. 52-4749, for example, fundamentally comprises data sets each having an index and a translation so that when inputting an index, its translation can be obtained which is easy to read by intuition. Further, ordinary electronic dictionaries are often used only for its retrieval, whereas such electronic dictionaries that a keyword is applied to data to be edited and retrieving operation is carried out on the basis of keywords, are suitable for easy handling of personal data. These are Generally called "personal data base" and have been put to practical use and spread as so-called card type data bases as shown in, e.g., the Japanese Patent Publication No. 59-870. In this case, it is common that a plurality of retrieval keys can be applied to one data, for which reason the number of correlations between the key and data become plural-to-plural and thus its data structure becomes more complicated than that of electronic dictionaries.

In electronic dictionaries, its user interface itself is also easy to understand because of its simple data structure. In so-called personal data bases, on the other hand, such basic operation that a key is applied for retrieving operation is the same as in the electronic dictionaries. However, increase in number of functions and complicated data structure make difficult for the user to operate such systems. In particular, designation of the retrieval key, which is a very important work which determines retrieval efficiency, is troublesome. As explained earlier, in an electronic dictionary, a basic data unit is made up of a pair of an index and a translation, the index itself becomes a retrieval key.

In a data base wherein a plurality of keywords can be set for one general record, on the other hand, it is necessary to designate the keywords by some means or other. In a card type personal data base, for example, it is common that when character strings are written as a keyword at a specified location, these become retrieval keys. Further, in text information, it is common to attach a certain name to each data and the name is held generally as a field. Since the data name can imply the data itself in a short word, it is often used as a retrieval key.

Meanwhile, in the prior art keyword retrieval system, it has been necessary for a user to change the data name as necessary and designate it as a retrieval key. When such keywords as mentioned above are written and arranged, in particular, this often doubly troublesomely requires addition and arrangement of the name.

In the conventional retrieving operation of an electronic dictionary, a title, an index or a character string corresponding thereto (which will be referred to merely as 'title', hereinafter) is basically entered to read out and display the contents of the corresponding data. Considering an English-Japanese dictionary, for example, the electronic dictionary has a comprehensive survey function of listing up all words starting with 'ab'. This function provides, when there are a plurality of corresponding candidates, display of the candidates on each candidate basis or on a plural-candidate basis so that the user can proceed a next step such as output/ display of the data which the user designated. The retrieving procedure holds true even for ordinary data bases. For the sake of retrieval convenience, such 'classification indexes' as in a thesaurus are previously provided or classification data are held to easy creation of the classification indexes. In this case, for convenience of retrieval, the whole data of the electronic dictionary or data base are previously sorted in an alphabetic order with respect to, e.g., index character strings or divided or classified into areas to allow easy retrieval based on the classification. Further, there are some Kana-Kanji conversion dictionaries for word processors, which the users can add data therein.

However, in the case of a general data base having an editing function, there has been devised to temporarily hold a retrieved result but the retrieved result itself never become new data or another independently accessible data. In a system using the aforementioned classification indexes, even if a retrieved result can be held in some form, because a user interface for reading out the held data must be provided separately from an original editing interface, the operability has been remarkably deteriorated. In other words, it has been impossible to hold the retrieved result itself as new data having exactly the same form as other data nor to handle the retrieved result independently in applications other than the data base. Furthermore, in word processors, restrictions are imposed on the format and content of registerable data and it is also impossible to extract a plurality of words from the dictionary and hold them in a list form. This generally holds true for so-called 'user's dictionaries'.

In these electronic dictionaries, desired data can be retrieved in various ways including word retrieval or complex retrieval and a retrieved result can be displayed in a predetermined area of the display screen.

However, in these electronic dictionaries, desired data can be retrieved but a display area for display of the retrieved data is fixed. For this reason, there has been such a defect that, when retrieval of one data is carried out after retrieval of another data, the first retrieved data being displayed disappears and it is impossible to look at a plurality of data at the same time or to compare these data. Further, even when a partial character string in the previously-retrieved data is used as a new retrieval key, the user must enter the character string newly with troublesome operation.

Since the prior art electronic dictionaries can have a function of merely presenting the retrieved data, it is difficult to create a new data source on the basis of a plurality of retrieved data.

SUMMARY OF THE INVENTION

It is an object of the present invention to provide a data management system which can solve the above problems in the prior art, can flexibly code with data of which attributes are to be frequently modified or even with various sorts of data, and can reflect a data structure intuitively manageable by users on a user interface including such editing operations as addition, deletion, update and registration.

Another object of the present invention is to provide a data management system which facilitates designation of a retrieval key.

A further object of the present invention is to provide a data management system which can handle a title attached to each data or a retrieving keyword in such an accessible form as in other data or an independent accessible form.

Yet a further object of the present invention is to provide a data management system which can make simultaneous reference to a plurality of data, can easily input retrieval keys associated with the retrieved data and further can easily create a new data source based on selected data.

In accordance with the present invention, each data unit of a data base holds a set of at least a data name, a data body and a data retrieval keyword group. For this reason, even when it is desired to add an attribute for example, the data body can be directly edited and it is unnecessary to re-construct a data base. Further, in user interfaces for retrieval and editing, since these three factors in the set are taken into consideration with respect to all windows to be displayed on a user interactive display, the user can intuitively manage the data structure, whereby the interfaces which are easy and understandable to the user can be provided.

The data name entered by the user is once held in a data name memory unit. When the user instructs registration of the data, a name key setting unit analyzes the character strings of the names held in the data name memory unit and sets a retrieval key for each data. In a data retrieval mode, since the names are displayed in a retrieval candidate display area, the user can recognize the data names and thus understandable and effective retrieving operation can be realized.

The user sets retrieval conditions through a list creation condition instructing unit, for example, through the user interfaces on the display. A list creating unit retrieves the memory unit under conditions instructed by the list creation condition instructing unit and links the titles of the obtained data in order and arranges it in a list form. And when the created list is managed as one data in the data base similarly to other data, the created list is handled as an independent text and becomes a data body to be stored in the data base or dictionary. Further, keywords attached to the retrieved data may be sequentially linked to be arranged in a list form and the list may be handled as an independent text like the aforementioned title list.

Since there is provided an other display area creating unit for creating a display area other than the data display unit for displaying the retrieved data and for displaying the same data as the data displayed on the data display unit, the number of such different display areas can be increased as necessary, so that data to be later referred to can be displayed in different display areas. Thus, a plurality of data can be seen at the same time or can be mutually compared. Since character strings in the data being displayed in the different display areas can be freely selected, when another display area is previously created, a character string in the previously retrieved data can be selected to be used as a new retrieval key.

Further, of the different display areas being displayed on the display screen, the display area selected by the user is stored in a plural-display area selecting unit and also is displayed as distinguished from the other display areas not selected. A new data retriever creating unit integrates more than one data displayed in one or more different display areas to create a new data source. Accordingly, such a new data source as, e.g., a data base can be easily created on the basis of data extracted from a data retriever.

BRIEF DESCRIPTION OF THE DRAWINGS

FIG. 17 shows an example of the created list;

FIG. 21 shows an example of contents of data stored in a data memory unit;

FIG. 35 is an example of contents stored in the data memory unit after the creation of the new data retriever is completed.

DESCRIPTION OF THE PREFERRED EMBODIMENTS

Detailed explanation will be made by referring to the attached drawings in connection with an embodiment in which a data management system according to the present invention is applied to an electronic dictionary.

Figure 2:
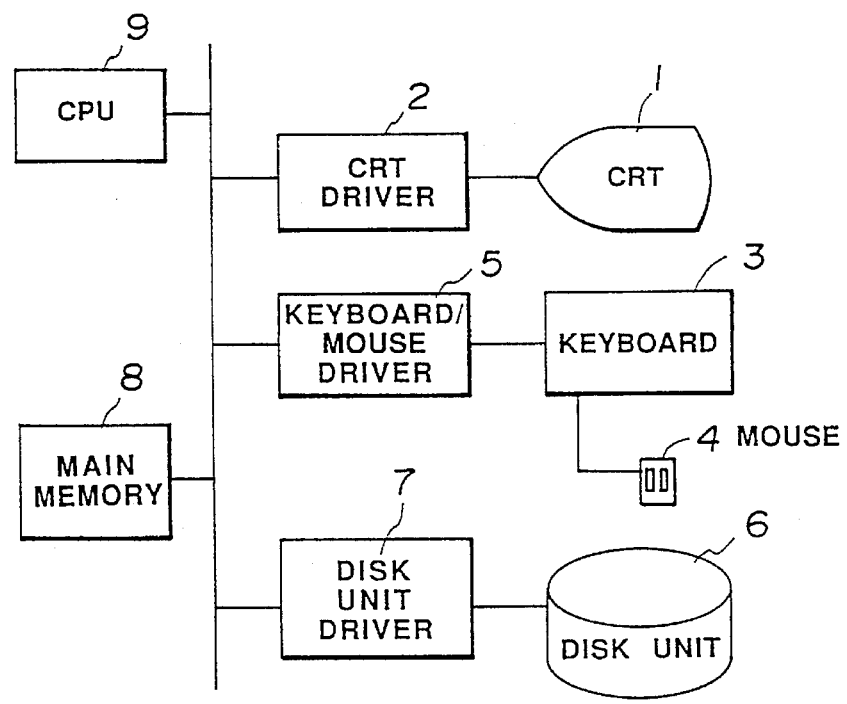
FIG. 2 is a block diagram of a schematic arrangement of the electronic dictionary system.

Referring first to FIG. 2, there is schematically shown an arrangement of an electronic dictionary system. This system includes a cathode-ray tube (CRT) 1 for displaying various sorts of data on a screen of the CRT, a CRT driver 2 for controlling the display of the CRT 1, a keyboard 3 for entering commands, character strings, numerical values or the like therethrough, a mouse 4 as a pointing device, a keyboard/mouse driver 5 for outputting various sorts of data, a disk unit 6, a disk unit driver 7, a main memory 8, and a central processing unit (CPU) 9.

More specifically, the disk unit 6 is a secondary memory for storing a large quantity of data therein, in which such a data base as to be explained later is stored. Input/output of data of the disk unit 6 is controlled by the disk unit driver 7.

The main memory 8 stores therein an application program for system operation, such data as characters, numerical values, etc. entered through the keyboard 3 or the mouse 4.

The CPU 9 is a circuit for performing general control over the system and also for performing arithmetic operation of predetermined data on the basis of various sorts of commands for the purpose of execution of data retrieval and editing to be described later.

Figure 1:
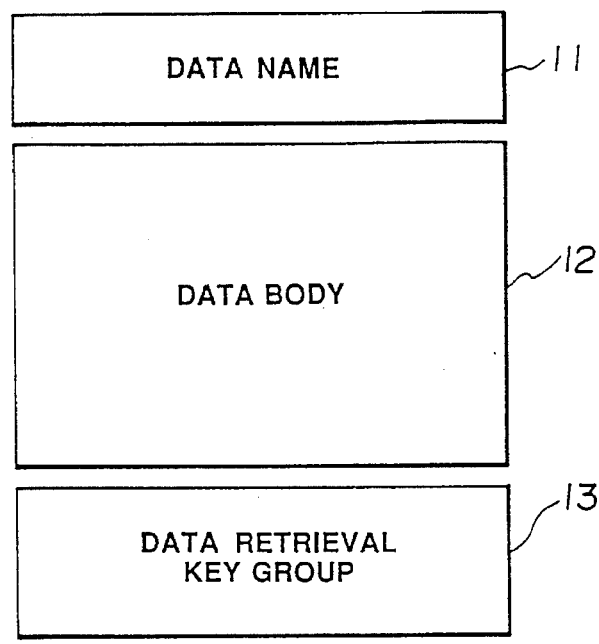
FIG. 1 schematically shows a data structure in an electronic dictionary system.

Shown in FIG. 1 is a schematic data structure in the aforementioned electronic dictionary system. With the data structure of FIG. 1, a record as the data unit of a data base comprises at least three fields in which a data name 11, data body 12 and a data retrieval key group 13 for retrieving data are stored respectively. With such a data structure, even when it is desired to newly add an attribute for example, the data structure can cope with it by directly editing the data body. Accordingly, it is not necessary to re-create a data base every time the editing operation is carried out. With respect to a retrieval/display window or an editing window, a convenient and simple user interface easy for the user to understand can be provided by taking the above set of three information into consideration. In this connection, the data unit for storage of three pieces of information is not limited to the above record but other data unit may be employed as necessary so long as the employed data unit can constitute at least three data areas.

Figure 3:
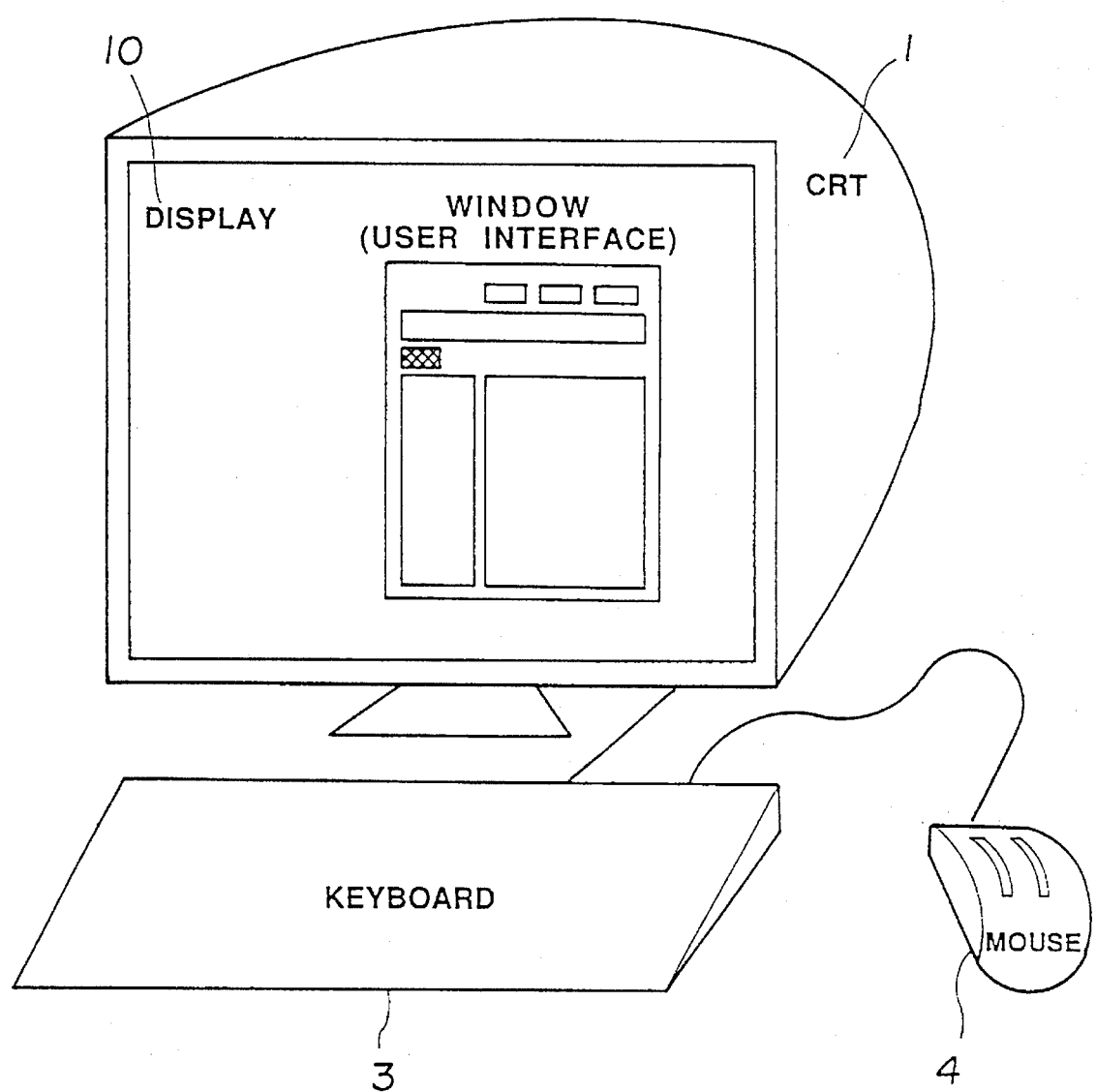
FIG. 3 shows an exemplary arrangement of a user interface system.

A user interface corresponding to the aforementioned data structure is provided by such a device as shown in FIG. 3. The device of FIG. 3 comprises the CRT 1, the keyboard 3 and the mouse 4 shown in FIG. 2, and a window displayed on a display 10 of the CRT 1 is an actual user interface.

Figure 4:
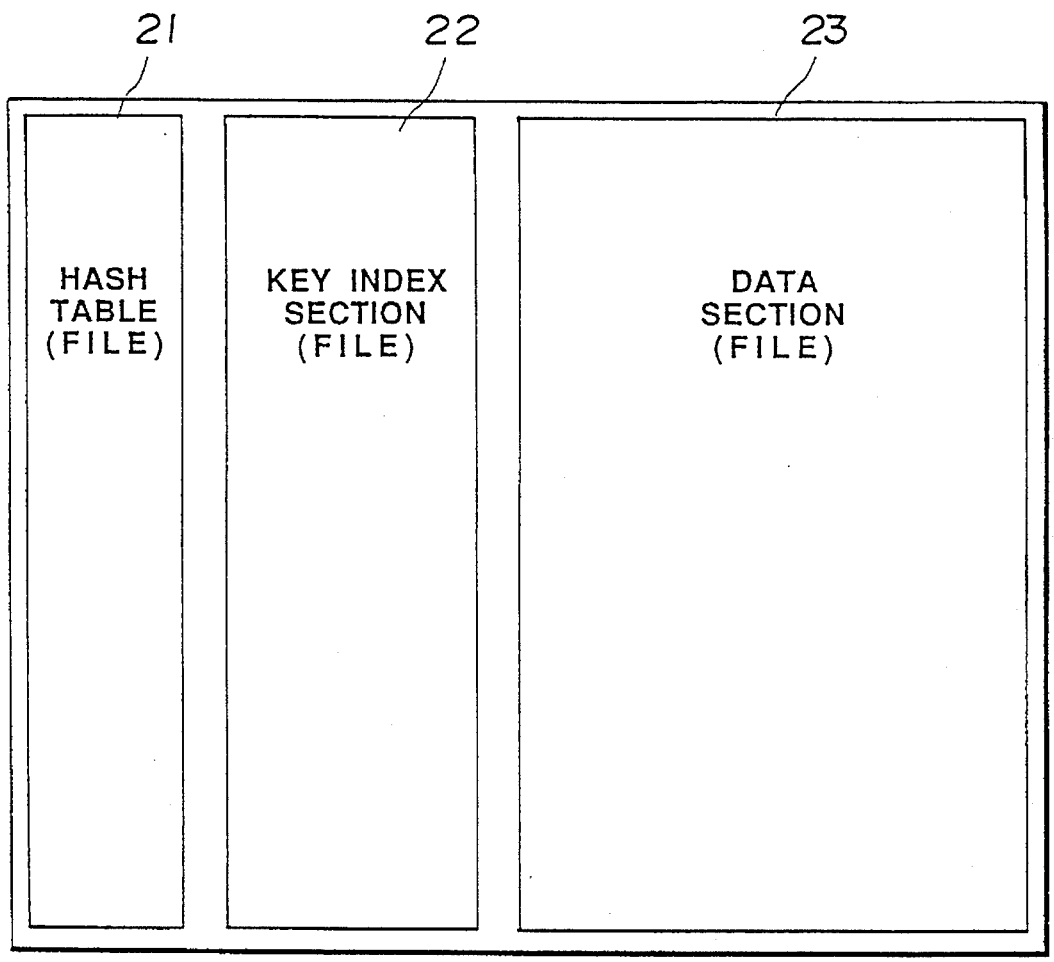
FIG. 4 shows a specific example of the data structure.

As shown in FIG. 4, the data structure as a data base is of a simple file configuration comprising a key hash table 21, a key index section 22 composed of actual keys, and a data section 23 for storing therein actual data body. Although it is assumed that the present embodiment employs such user interface and file configuration as shown in FIGS. 3 and 4, another suitable arrangement may be employed so long as the employed arrangement has a function equivalent thereto.

Figure 5:
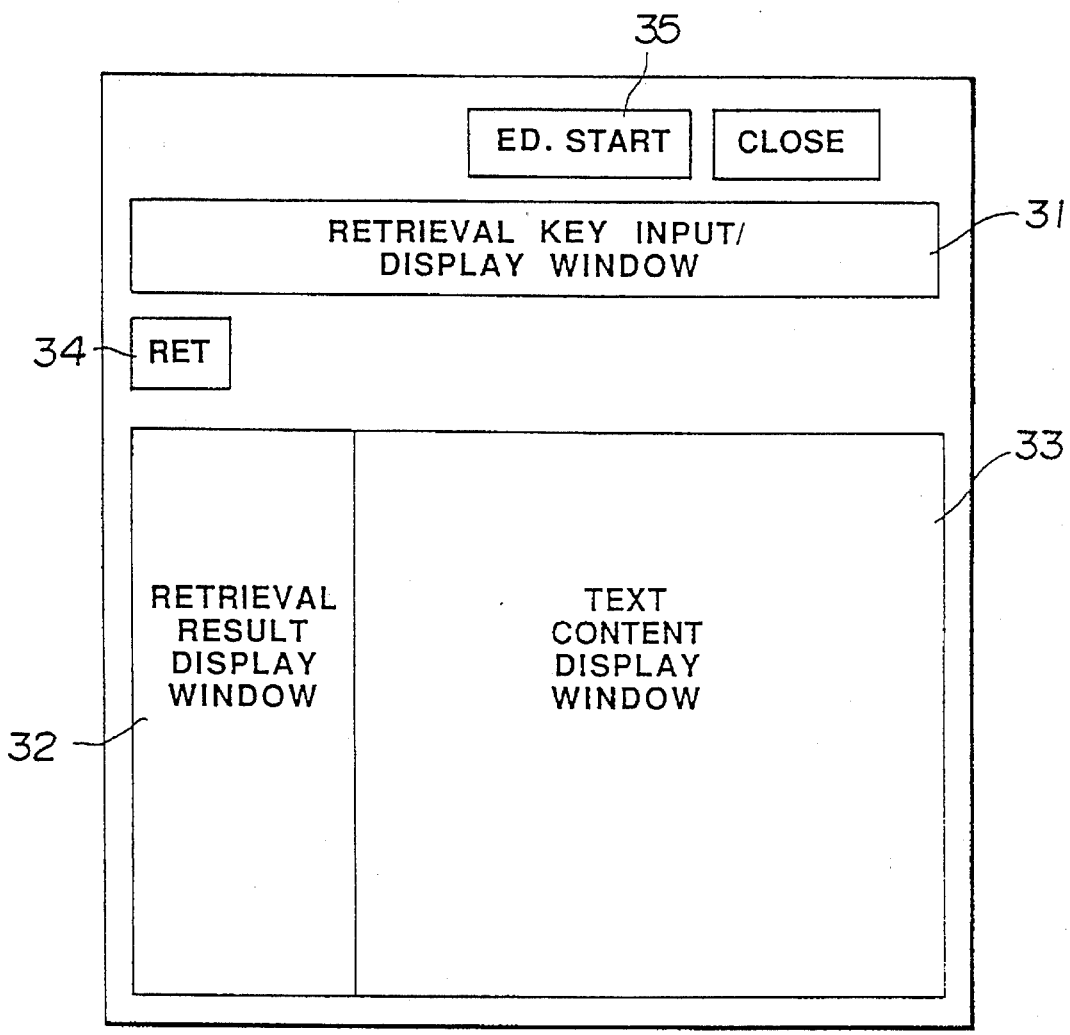
FIG. 5 shows windows on a display in a retrieve mode.

FIG. 5 shows windows on the display screen in a retrieval mode as an exemplary user interface for retrieval. In this case, three basic windows 31, 32 and 33 correspond to the three pieces of information in the set of FIG. 1. In more detail, the retrieval key input/display window 31 as an area for input and display of a keyword to be retrieved corresponds to the group of data retrieval keys, the retrieval result display window 32 as an area for display of the name of at least one data obtained through the retrieval in the form of a list corresponds to the data name, and the text content display window 33 as an area for display of the associated data body corresponds to the data body.

Figure 6:
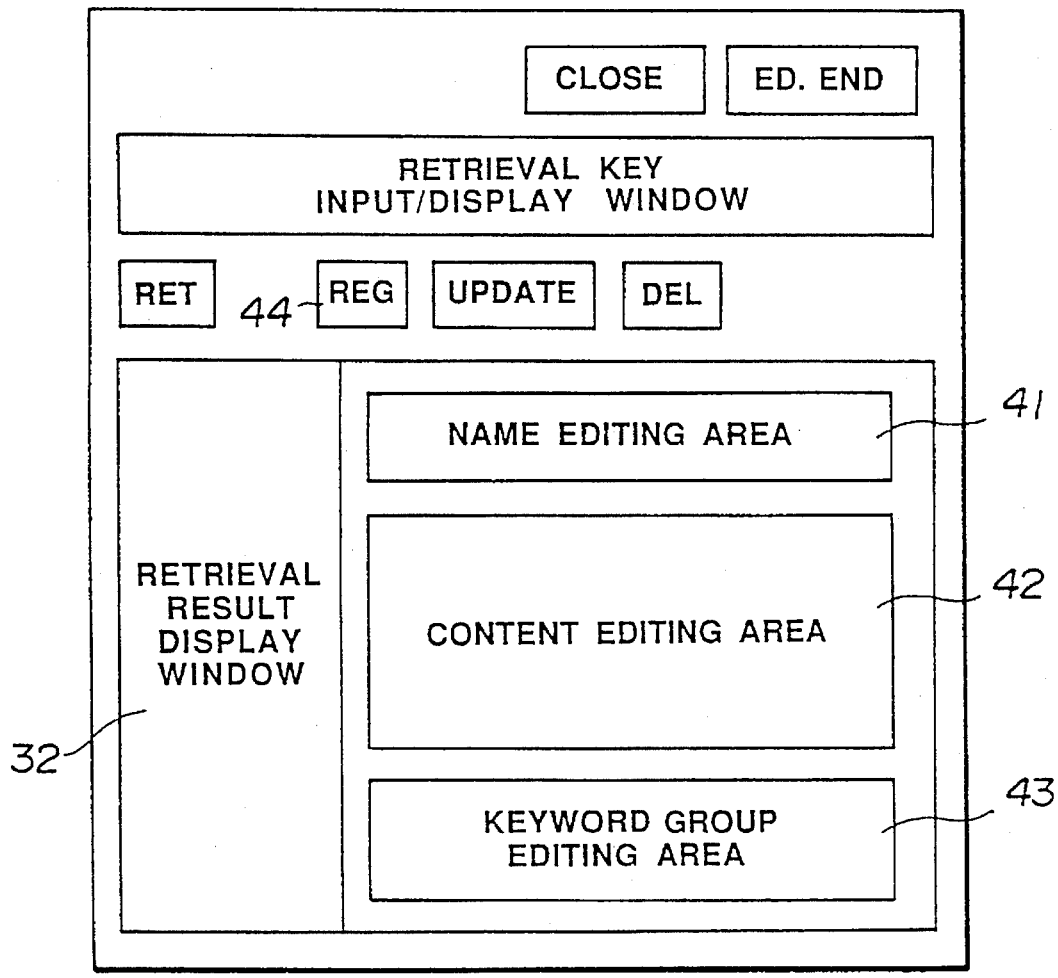
FIG. 6 shows editing windows on the display in an edit mode.

An editing window in an edit mode is shown in FIG. 6 as an exemplary user interface for editing. In this editing window, the area for use as the data content display window in the retrieval mode has three individual editing areas, that is, a name editing area 41, a content editing area 42 and a keyword group editing area 43. These editing areas 41 to 43 correspond to the three pieces of information in the set shown in FIG. 1, respectively. More specifically, the name editing area 41 for the input and display of the data name corresponds to the data name, the content editing area 42 for the input and display of the data body corresponds to the data body, and the keyword group editing area 43 for the input and display of a keyword group for data retrieval corresponds to the data retrieval key group.

When it is desired to perform retrieving operation as at the time of consulting an ordinary dictionary, the user opens the window of FIG. 5, enters necessary retrieval keys into the retrieval key input/display window 31, and then pushes a retrieve button "RET" 34. This causes calculation of a key hash value and retrieval of the key index section. At this time, if there is a corresponding key, then a list of corresponding keywords or names for data is created and displayed on the retrieval result display window 32. Thereafter, when the user selects desired one or ones of the keywords or names from the list with use of the mouse or the like, this causes the corresponding data contents to be called from the data section and displayed on the text content display window 33. When the single candidate is displayed on the retrieval result display window 32, the corresponding data content is displayed without waiting for user's selection.

When data registration is desired, the user pushes an edit button "ED.START" 35 to put the system in the edit mode. At this time, such windows as shown in FIG. 6 appear on the display screen. The user enters character strings or data through such input unit as a keyboard into the respective name, content and keyword group editing areas 41, 42 and 43 as already explained above, and then pushes a register button "REG" 44 to execute its registering operation.

Specific examples (1) to (6) of data retrieval based on the data structure of FIG. 1 will be explained.

(1) Hypertext-like or hierarchy retrieval

For example, when there are two data on ostrich and bird and the user wishes to describe a relationship between the ostrich and bird, "←bird" is previously given in the description of the ostrich data while "→ostrich" is previously given in the description of the bird data. As a result, after retrieval of the ostrich, the user can immediately select a character string on bird as a higher concept of ostrich with use of the mouse or the like and pushes the "RET" button to retrieve the bird data. In this way, by expressing the higher/lower conceptional relationships in terms of symbols "←→" and the adjoining or inclusive relationships in terms of symbols "↓↑", hypertext-like or hierarchy data management, maintenance and retrieval can be realized.

(2) Creating secondary and tertiary data

When it is desired to arrange a patent search result in the form of one data per one invention for example and a patent is judged to be marked, the user attaches such a key as "o" thereto. Accordingly, the next retrieving operation with respect to "o" results in that all patents attached with "o", i.e., a list of all the marked patents are obtained. In this way, even when the data contents or the keyword contents as in the present example vary with time, the invention can cope with it flexible.

(3) Partial assembling and integration

In the case of the aforementioned data structure, since the 3-element structure does not depend on the data content, all the data bases can be simply integrated. The integration may be realized, for example, by registering the content of one data base into another data base on a case basis. Further, a partial list obtained by a retrieval key or the logical expression of the retrieval key can be easily cut out as another data base.

(4) Held function

When data for overview of the entire data base, data for assisting at the time of getting in trouble, or data for telling the basic content structure of data is created and previously registered as attached with, e.g., a name "?" or a keyword "?", a so-called help function or an electronic manual can be easily realized. This function may be arranged to be automatically retrieved simultaneously at the time of opening the data base window.

(5) Simple memorandum function

Even in the case where the name is lack in the aforementioned three pieces of information in the set, if at least one of the remaining two pieces of information exists, then registration can be sequentially carried out in such an incomplete condition so long as such three hyphens as "- - -" is automatically attached to the name area. When data registration can be carried out without filling all the areas in this way, such data as memorandum data can be readily registered.

(6) Template card

Such a card on which items to be incorporated in a content are written can be previously registered as a template. Since this can be considered to be one of applications of the partial assembling and integration in the previous Paragraph (3), such a device as to give "?" to the template as one of the names or keywords can be realized.

in this way, in the present data management system, since one data unit is composed of a set of at least three of data name, data body and data retrieval keyword group, even when it becomes necessary to add an attribute for example, the present system can cope with it by directly editing the data body, thereby eliminating the need for re-constructing a data base each time such an attribute is added. Accordingly, the system can flexibly cope with such data of which attributes are frequently modified or even with various sorts of data.

Further, since even the retrieval or editing user interface is designed taking the above three pieces of information into consideration, data structure can be intuitively managed so that the interface can be made simple and understandable for the user.

Detailed explanation will next be made as to a second embodiment of the data management system by referring to the drawings.

Figure 7:
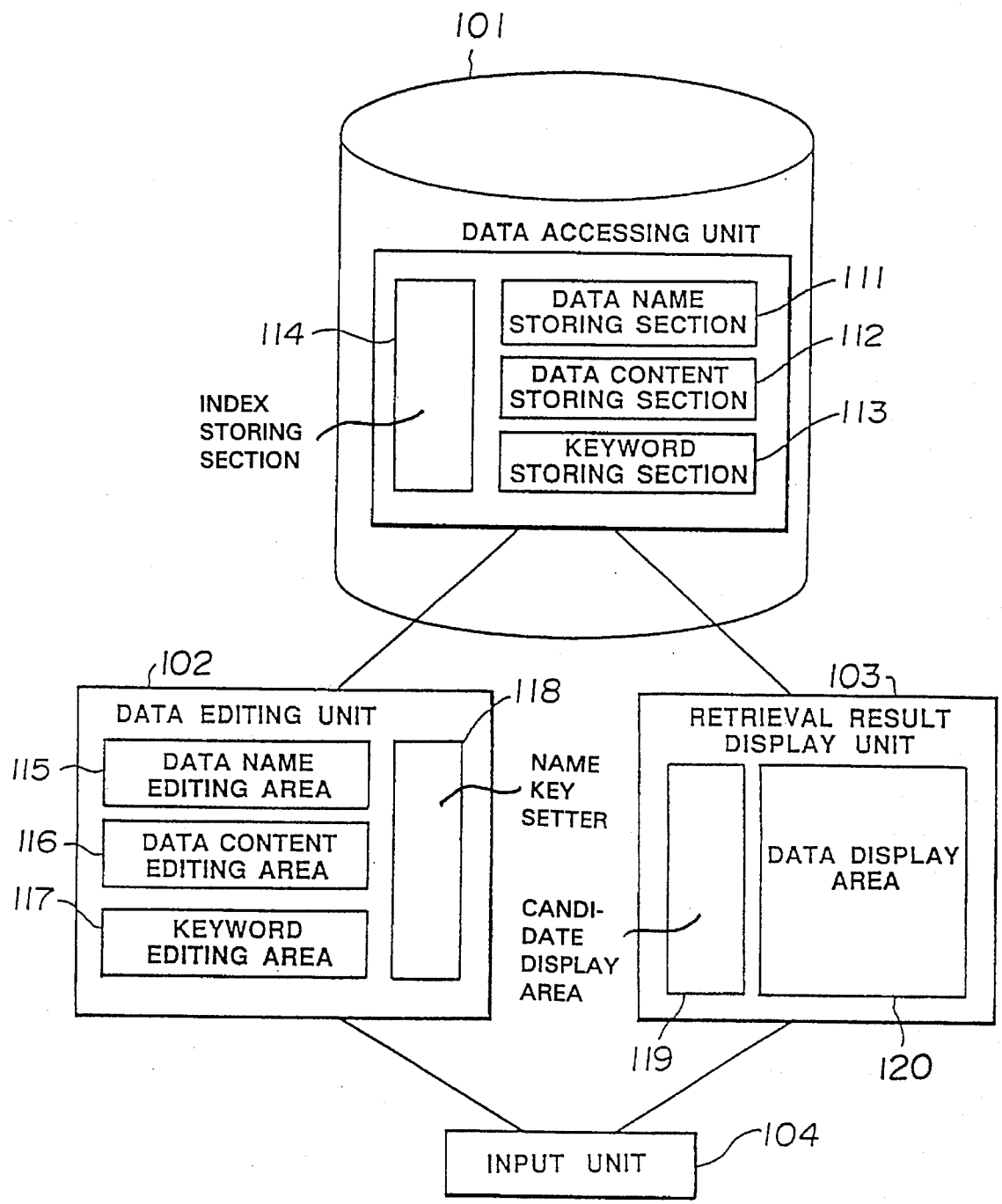
FIG. 7 is a block diagram of a schematic arrangement of a personal data base.

FIG. 7 is a block diagram of a schematic arrangement of a personal data base. This personal data base comprises a data accessing unit 101, a data editing unit 102, a retrieval result displaying unit 103, and an input unit 104.

In more detail, the data accessing unit 101 includes a data name storing section 111 for holding the name of a data therein, a data content storing section 112 for holding the content of a data body therein, a keyword storing section 113 for holding a keyword group, and an index storing section 114 for indexing the retrieval key. The data accessing unit 101 may have a data base function of giving a plurality of retrieval keys to each record. In this case, each record is of a data format having three fields for the data name, data body and keyword group. These three fields correspond to the above data name storing section 111, data content storing section 112 and keyword storing section 113 respectively. The name and keyword group are set as retrieval keys in each record through such operation as to be described later and stored in the index storing section 114 at the corresponding indexes. In this personal data base, attention is paid especially to the name of a record to be registered in the data base and all the data are treated as having a data structure of name and content. This corresponds to a framing of index and its text in an electronic dictionary.

The data editing unit 102 has a data name editing area 115, a data content editing area 116 and a keyword editing area 117 which correspond to the three fields of the data name, data body and keyword group in the data accessing unit 101 respectively. Also included in the data editing unit 102 is a name key setter 118 for setting a retrieval key when data is required to be registered. In the illustrated embodiment, character strings inputted in the name and keyword areas are analyzed to set the respective retrieval keys. The data thus edited is stored in the data accessing unit 101.

The data stored in the data accessing unit 101 is displayed through the retrieval result display unit 103 in the retrieval mode. In the mode, the names of the data having the entered retrieval key are displayed in a candidate display area 119 of the retrieval result display unit 103 and the content of the selected data is displayed in a data display area 120 of the retrieval result display unit 103.

Connected to the input unit 104 are the keyboard and mouse to be used for input in the edit and retrieval modes.

Next, the specific operation of the aforementioned personal data base will be detailed by referring to FIGS. 8 to 11.

Figure 8:
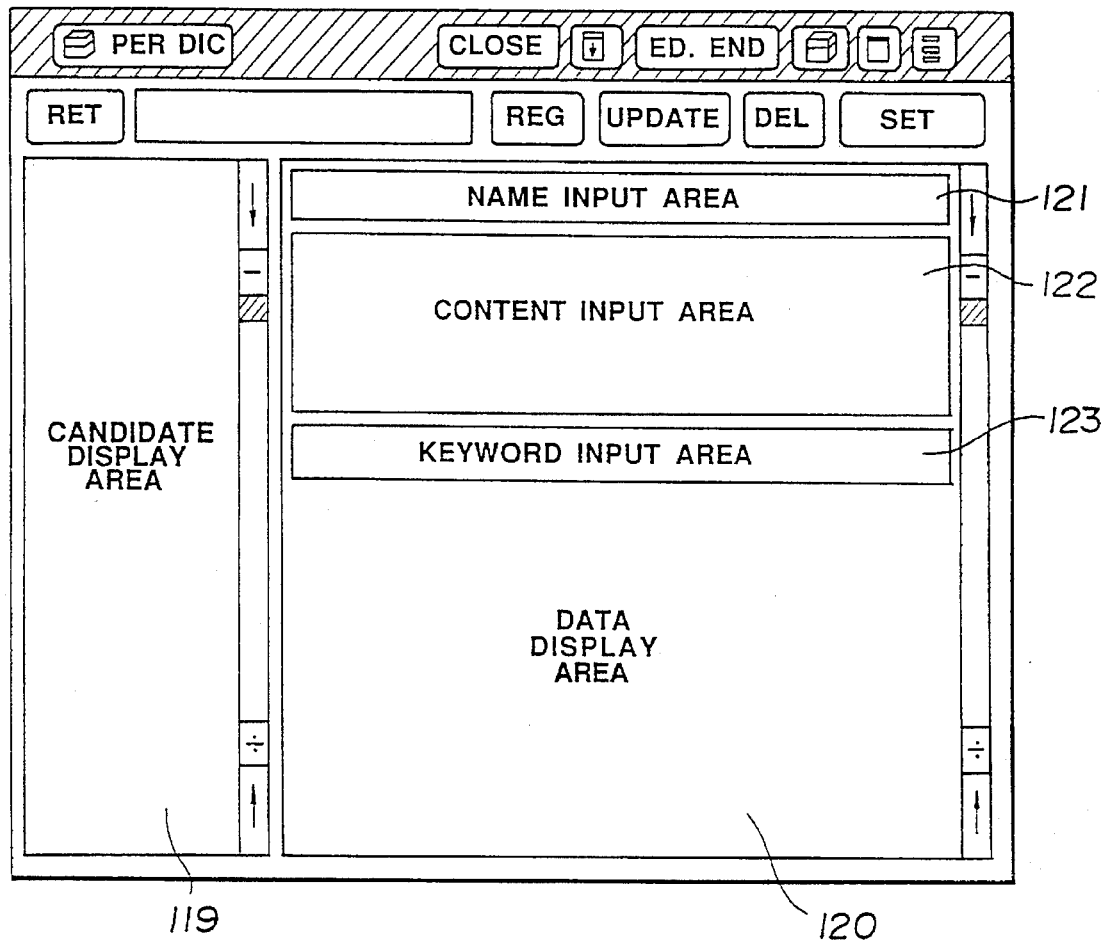
FIG. 8 shows an initial display screen in the edit condition.

Shown in FIG. 8 is an initial display screen in the edit mode when the personal data base is used as a personal dictionary. It is assumed in the present embodiment that the embodiment is utilized on a workstation or a personal computer, the entire configuration of the system is expressed in the form of a single window which allows change-over between the edit and retrieval modes. Further set in the window are the candidate display area 119 as a retrieval area and the data display area 120 having three individual editing areas of a name input area 121, a content input area 122 and a keyword input area 123. The respective areas of the window are null in the initial condition as illustrated and thus the user can freely enter character strings and/or data through the input unit 104. Although the three editing areas have been provided in the present embodiment, the number of such editing areas may be arbitrarily set as necessary.

Figure 9:
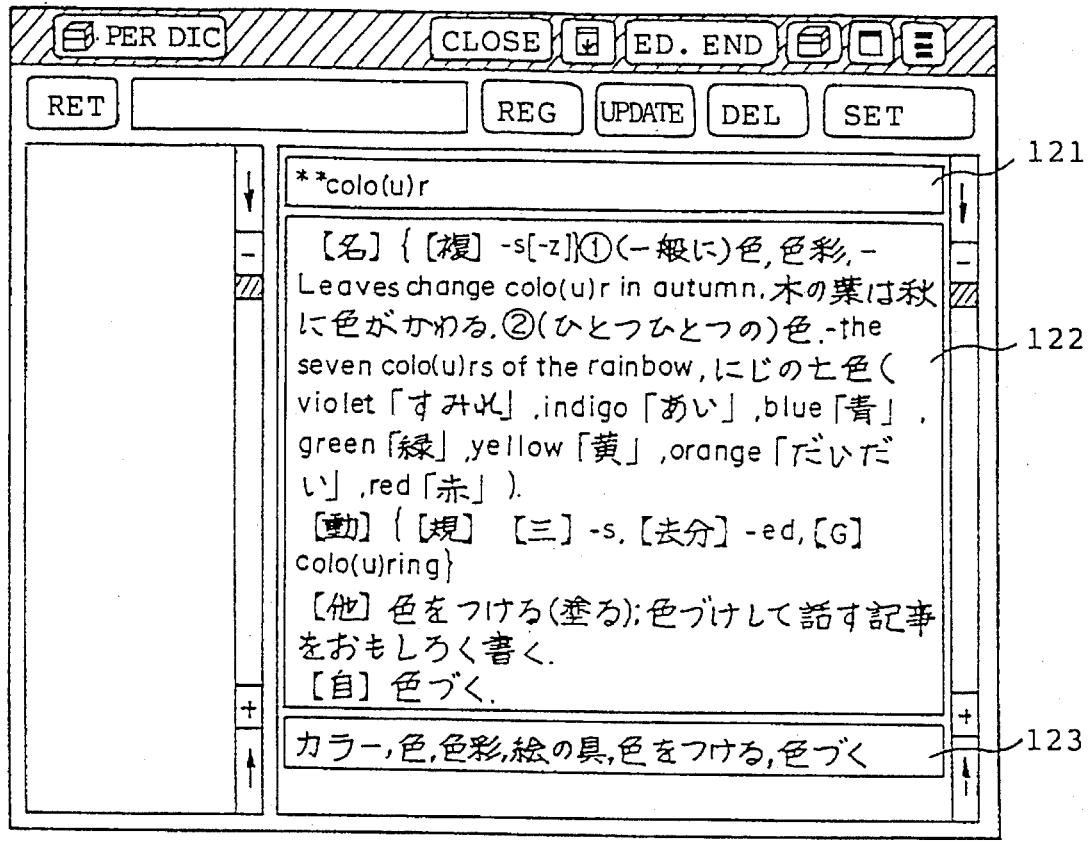
FIG. 9 is an exemplary screen display during editing operation.

FIG. 9 shows an exemplary display screen of the personal dictionary in the edit mode. In this case, the user entered a word "color". Thus an index "xxcolo(u)r" appears in the name input area 121. The beginning mark 'xx' in the index represents one of the most important words. Further '(u)' in the middle of the index means that both spellings 'color' and 'colour' are allowed. Thus, such a general notation as common in dictionaries is employed. In addition to the above notation, such a notation as, for example, 'centre <British>' and 'center <American>' may be employed when a word is different in spelling between British and American English.

Entered in the content input area 122 is a dictionary description as actual data. The data to be entered into the content input area 122 may be arbitrary so long as the data is of a text type. Though the index is omitted in the dictionary description in the illustrated example, the index may be overlappedly entered therein if necessary.

Keywords are entered in the keyword input area 123 in such a manner that each keyword is separated as delimited by mark "," or "、" In the illustrated example, the keywords include a Katakana representation corresponding to the pronunciation of the word "color" and representations corresponding to meanings thereof. These keywords can be entered through the keyboard, but when the user specifies a key set button "SET" for a character string selected on the display screen, this causes the keyword to be automatically entered as delimited by ','. Explanation is made in the present embodiment as to the case where the user himself or herself enters such keywords from the viewpoint that user's input while taking the actual data structure into consideration is considered useful. Therefore, as an example, the elements of the content may be analyzed to automatically extract frequently appearing words and enter them into the keyword input area 123.

After completing the editing of the three areas, the user specifies a register button "REG" when there is data to be newly registered or specifies an update button "UPDATE" when there is already existing data. At this time, setting of the retrieval key is carried out by the name key setter 118 of the data editing unit 102. Based on the idea that not only the keyword but also the name is generally valid as retrieval keys, character strings entered in the name input area 121 and keyword input area 123 are analyzed to be set as retrieval keys. In the case of keywords, these are separated as delimited basically by "," or "ใ" while, in the case of name, its processing varies depending on the contents of the index. For example, in the case of FIG. 9, the index "xx colo(u)r" is analyzed. That is, 'xx' is deleted and with respect to '(u)', retrieval keys for two words 'color' and 'colour' are set with the letter 'u' in the parentheses () omitted and not omitted. In another case of the "centre <British>, center <American>", such analysis is carried out as to divide it into 'centre' and 'center' by delimiting them by the delimiter ',' and then removing the brackets <>. Such a rule is described in the interior of the name key setter 118 and can be rewritten according to the data.

In the case of the personal data base, such a partial input as to enter only the name is frequently effected. To this end, in the present embodiment, when at least one of the three fields is subjected to a data input, the system is designed to confirm the input and allows its registration. In particular, when no name is entered, '- - -' is automatically set as a temporary or dummy name.

Figure 10:
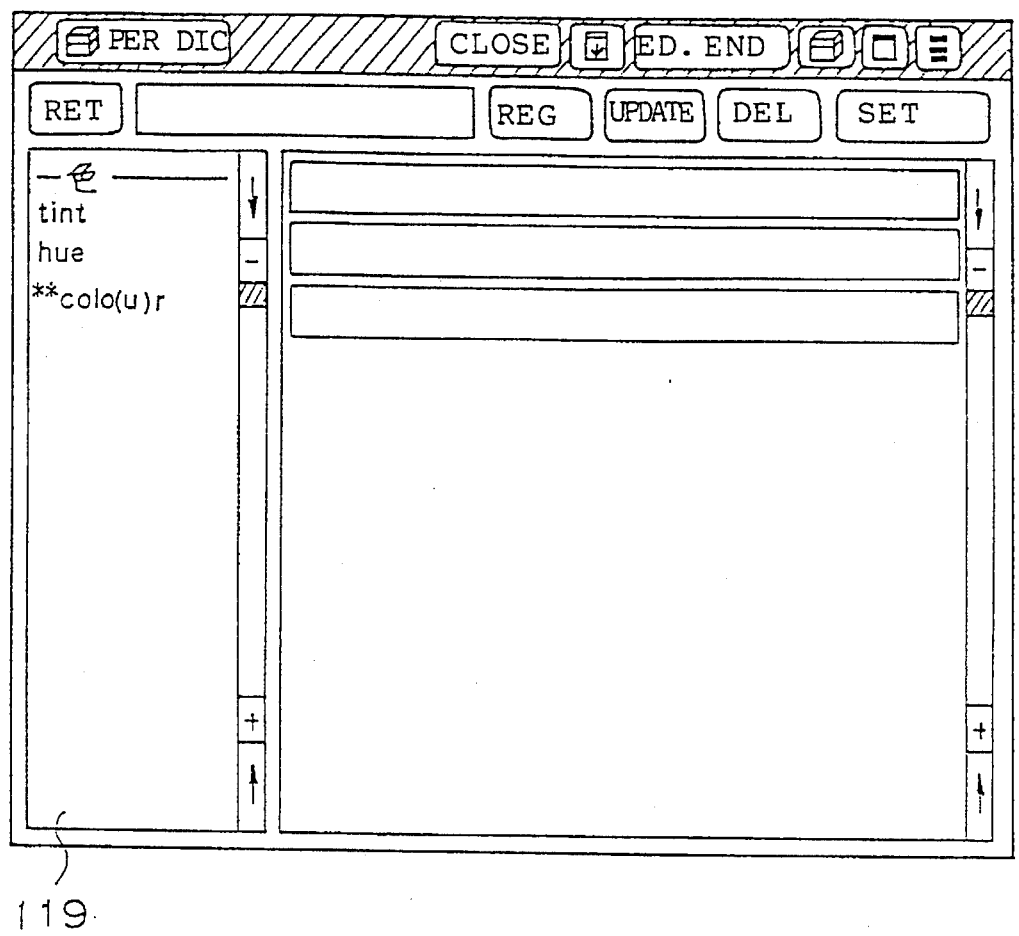
FIG. 10 is an exemplary screen display in a retrieval mode.

The data thus registered in the data accessing unit 101 is retrieved through the retrieval result display unit 103. In the present embodiment, when the user specifies an edit end button "ED.END", this causes the screen to be changed to a retrieval screen. FIG. 10 shows an exemplary screen display in the retrieval mode. FIG. 10 illustrates candidate examples displayed when a word having a meaning of 'color' is retrieved. More specifically, three candidates are displayed in the candidate display area 119. In general, when plural retrieval keys can be set, there can be a plurality of candidates, for which reason its display method becomes problematic. However, when an exclusive candidate display area is prepared while leaving the content display area, it becomes easy to obtain a retrieval result. In other words, since it is common to give such a name as to explicit its content, it is practically sufficient to display only the name for distinction between candidates. Even if a similar or identical name exists, the number of candidates are restricted to a limited value at the time the candidates are displayed, it is expected to obtain a result only by making reference to the contents of several of the candidates. In this way, since such naming makes the user conscious of the corresponding data name, understandable and effective retrieving operation can be realized.

Figure 11:
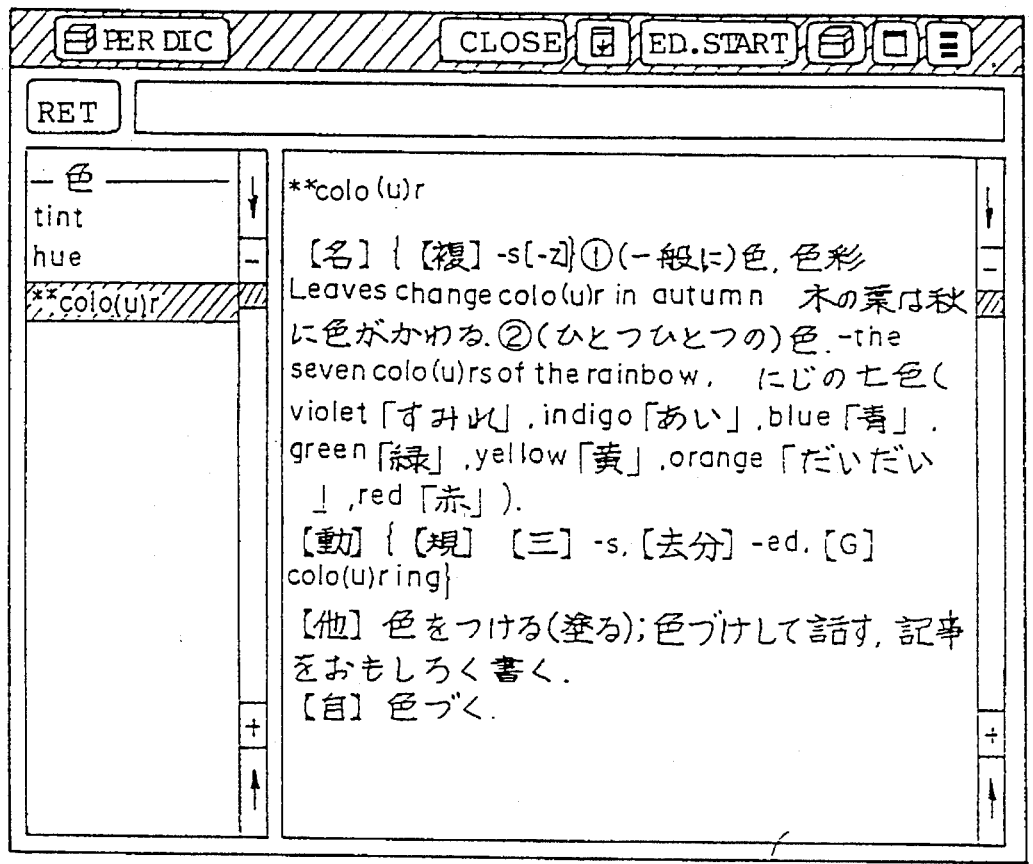
FIG. 11 is an exemplary screen display during retrieving operation.

Referring to FIG. 11, there is shown an exemplary screen display when the aforementioned "xxcolo(u)r" is selected from the plurality of candidates, in which the index "xx colo(u)r" and its dictionary description are displayed in the data display area 120. Since it is generally unnecessary to take the keywords into consideration in the retrieval mode, the keywords written in the keyword input area 123 are not displayed. When name's candidate is single, it is unnecessary for the user to specify it and its content is automatically displayed. Further, the system may be designed to automatically select such data that is frequently retrieved.

The data management system in accordance with the present invention can be applied to general data to which name and data and keyword can be attached and not limited only to such a personal data base as in the foregoing embodiment. For example, it is considered to realize it as a card managing unit in a KJ method. As well known, in the KJ method, a suitable name is attached to a card and such cards are grouped for the purpose of aiding idea development. This system is suitable for handling such a type of data. When the system is applied to the KJ method, the user interface in the embodiment can be applied as it is.

In this way, since the data management system is designed to set a data name as a retrieval key at the time of editing the data, troublesome designation of the retrieval key can be eliminated and the work can be simplified. Further, since a data name is made conscious by the user, understandable and effective retrieving operation can be realized.

Detailed explanation will next be made as to a third embodiment of the data management system by referring to the drawings.

Figure 13:
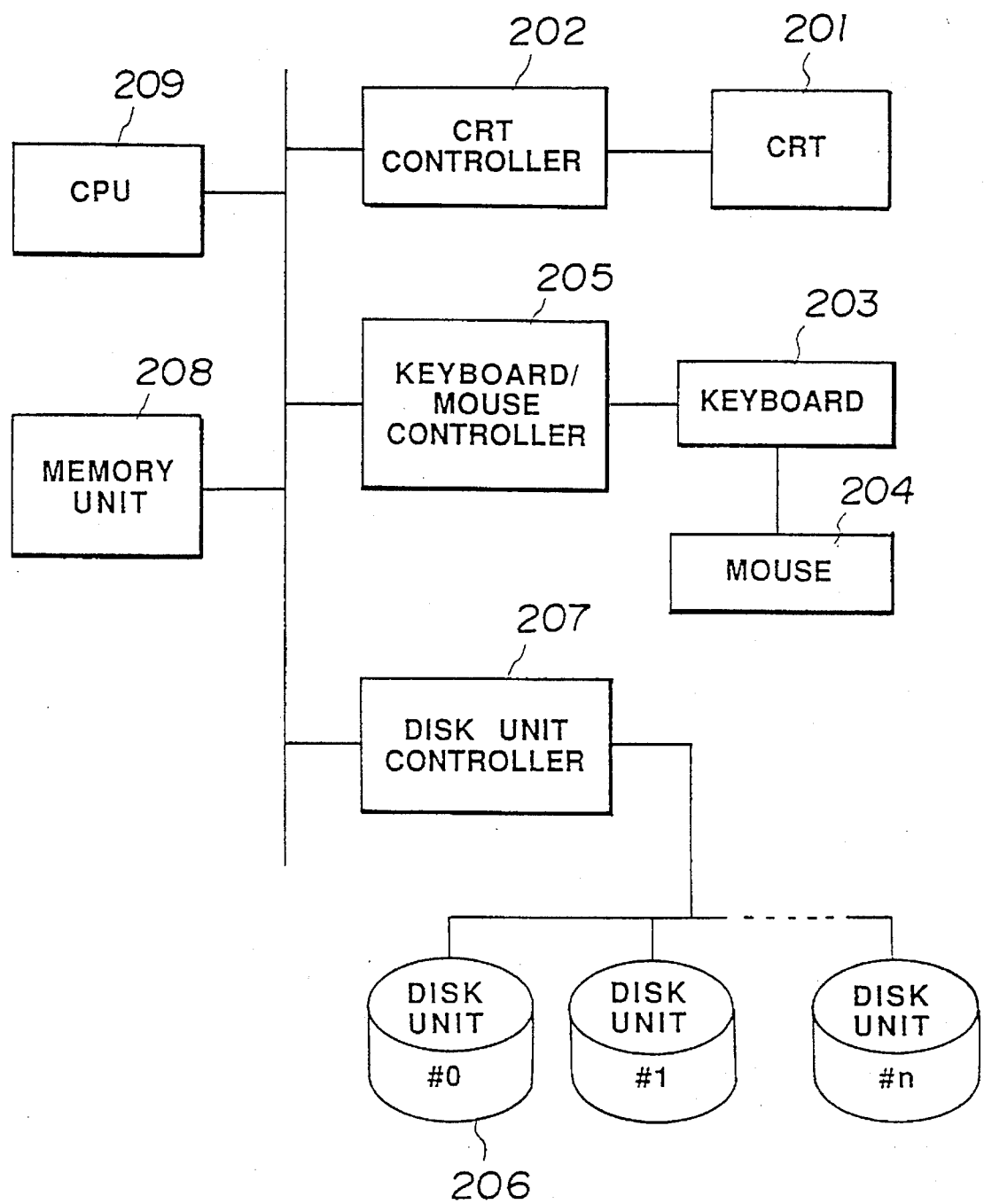
FIG. 13 is a block diagram of an arrangement of an embodiment of the data management system.

Shown in FIG. 13 is a block diagram of an arrangement of the embodiment of the data management system. This data management system, which is assumed to be designed for an editable electronic dictionary or data base, comprises the following parts to be explained below.

A CRT controller 202 is used to control a CRT 201 on which display screen various sorts of data including data stored in disk units 206 in addition to windows and icons are displayed.

A keyboard 203 is an input device through which the user enters such character strings as a retrieval condition, numerical values, commands, etc. Connected to the keyboard 203 is a mouse 204 as a pointing device. The mouse 204 is used to move a cursor displayed on the CRT 201 or to click one of the displayed icons to input a predetermined command to the system. Various sorts of data or commands entered through user's operation of the keyboard 203 or mouse 204 are sent to a central processing unit (CPU) 209 through a keyboard/mouse controller 205.

The disk unit 206 stores therein data bases/dictionaries in which a title is attached to each data. A disk unit controller 207 controls input/output of data in the disk unit 206. More specifically, the disk unit controller 207 is connected with a plurality of disks #0 to #n of the disk unit 206 so that a data base/dictionary system to be explained below is formed as made up of the data stored in these disks.

A memory unit 208 stores therein a program for control of the data management system and also temporarily stores various sorts of work data therein.

The CPU 209 performs general control over the entire system and also performs arithmetic operations of predetermined data based on various sorts of commands. The CPU 209 has functions of creating a list of titles for data being stored in the disks, storing and making a comprehensive survey of the list in a data base or an electronic dictionary as in other data. These are realized by such various sorts of function units as shown in FIG. 12.

Figure 12:
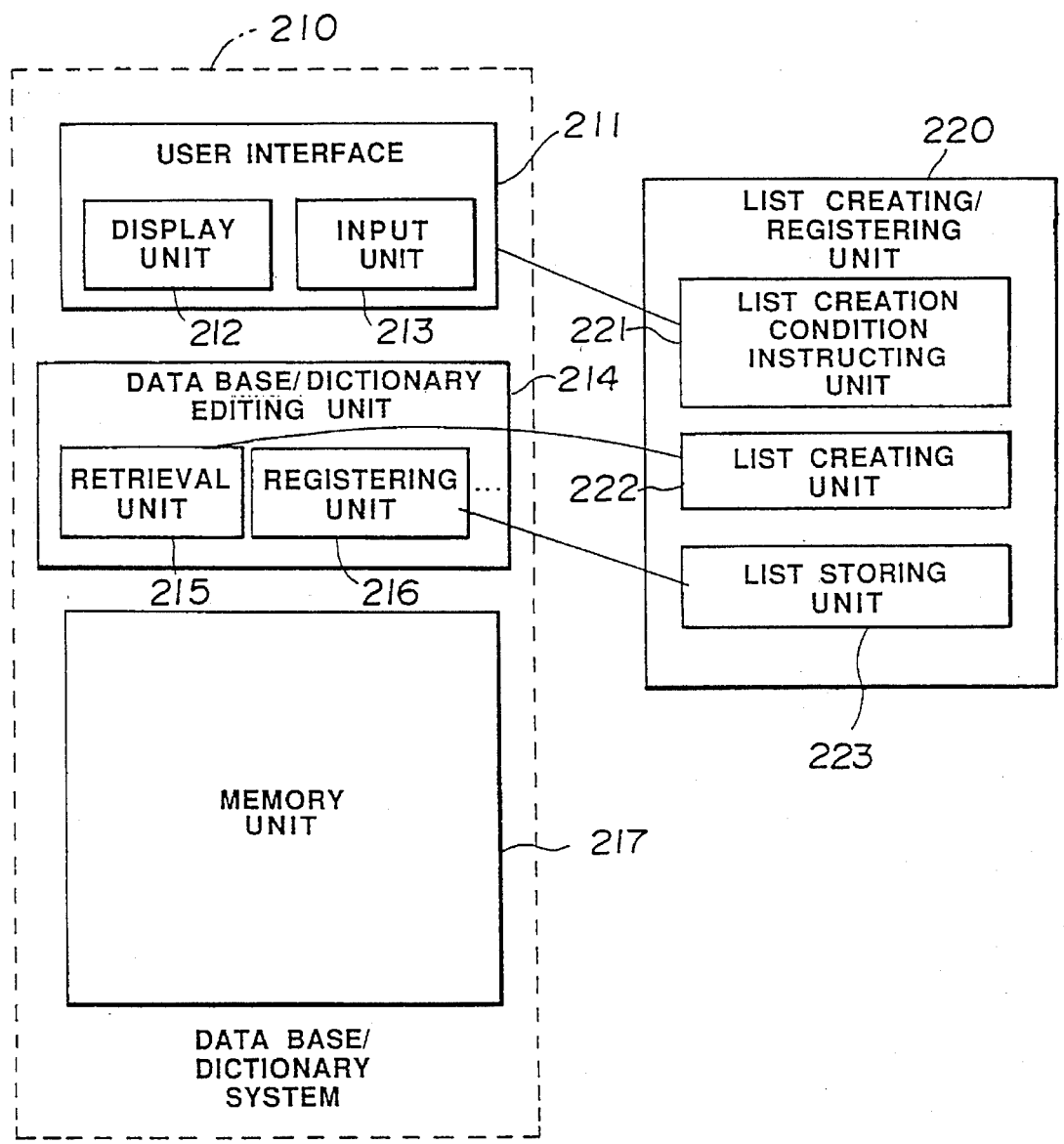
FIG. 12 shows a functional arrangement of a data base/dictionary system and a list creating/registering unit formed by a data management system.

FIG. 12 shows a functional arrangement of a data base/dictionary system 210 and list creating/registering unit 220 formed by the above data management system.

The data base/dictionary system 210 includes a user interface 211 which in turn has a display unit 212 corresponding to the CRT 201 and CRT controller 202 in FIG. 13 and also has an input unit 213 corresponding to the keyboard 203, mouse 204 and keyboard/mouse controller 205 in FIG. 13. Also included in the data base/dictionary system is a data base/dictionary editing unit 214 which performs various sorts of editing operations over a data base or an electronic dictionary. The data base/dictionary editing unit 214 has a retrieval unit 215 for retrieving the data base or electronic dictionary with use of such character strings as a title and an index and also has registering unit 216 for registering or deleting various sorts of data in or from the data base or dictionary. The data base/dictionary editing unit 214 corresponds to the CPU 209 and memory 208 in FIG. 13. A memory unit 217 stores therein a plurality of data bases and dictionaries each having a title, corresponds to the disk unit 206 in FIG. 13.

In the data base/dictionary system 210, each data is attached with 0 or a plurality of keywords and when data is attached with one or more keywords, the data can be retrieved on the basis of the keywords. Each data is also attached with a title and can be retrieved on the basis of the title.

The list creaking/registering unit 220, which includes a list creation condition instructing unit 221, a list creating unit 222 and a list storing unit 223, corresponds to the aforementioned CPU 209 and memory 208.

The list creation condition instructing unit 221, when the user wishes to create a list, instructs the creation through such an interface as a menu or a button. For example, through the list creation condition instructing unit 221, another exclusive window is displayed and the user can instruct a retrieval condition and so on. The start of the processing can be instructed in the exclusive window to thereby start the retrieving operation of a data to be listed up.

The list creating unit 222 carries out the retrieving operation and sequentially links data titles in such a manner that each data title is sandwiched by tabs, carriage returns, or the like to allow the resultant data to be handled as an independent text. For example, the list creating unit 222 handles a data body as a resultant list itself and stores or manages the created list as one or a plurality of data in the original data base or electronic dictionary. The title given to the list is regarded as such a character string as created by linking a character string used in the retrieval conditions to a character string 'list' and the character string used in the retrieval conditions is given as the retrieval key to create new data.

The list storing unit 223 registers the data of the created list in the data memory unit 217 to allow retrieval through the retrieval unit 215.

Figure 14:
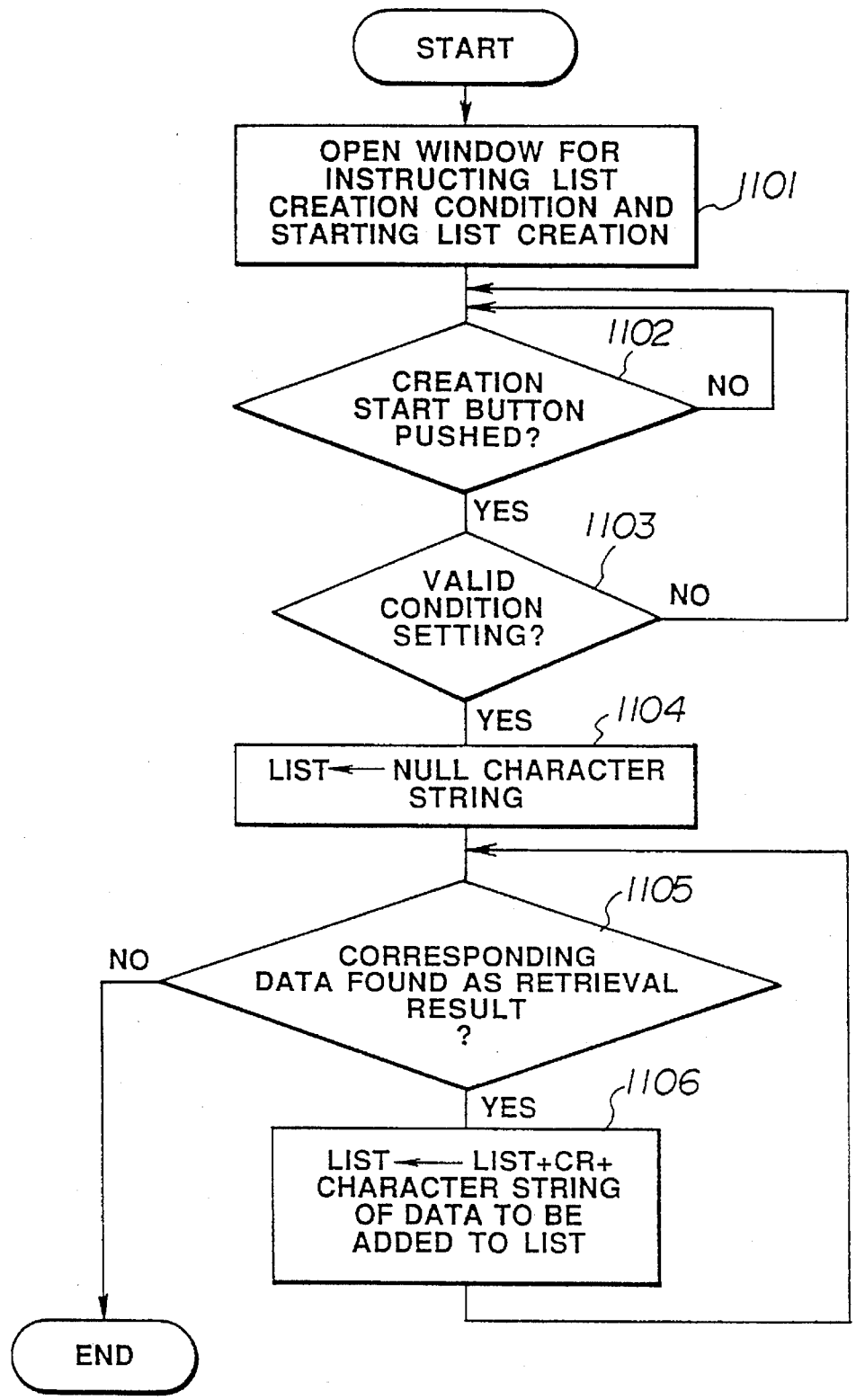
FIG. 14 is a flowchart for explaining the processing procedure of the system when creating a list of titles of data retrieved by a specific retrieval key.

Explanation will next be made as to the processing procedure when a list of titles of the data retrieved through a specific retrieval key is created with reference to a flowchart of FIG. 14. In this case, it is assumed that such a list is created by linking titles with CRs (carriage return).

First, the list creation condition instructing unit 221 opens a window for instructing a list creation condition and starting the list creation (step 1101). If the user pushes a creation start button (step 1102) and his condition setting is valid (step 1103), then the user enters a null character string into 'LIST' (step 1104). Subsequently, data retrieving operation is carried out based on the entered retrieval key and it is judged whether or not the corresponding data is found (step 1105). When the corresponding data is found, CR and a character string associated with the title of data to be added to the list are added to LIST (step 1106). The above steps 1105 and 1106 are repeated until the corresponding data are not found. When the processing is completed, the above LIST is the data to be found.

Figure 15:
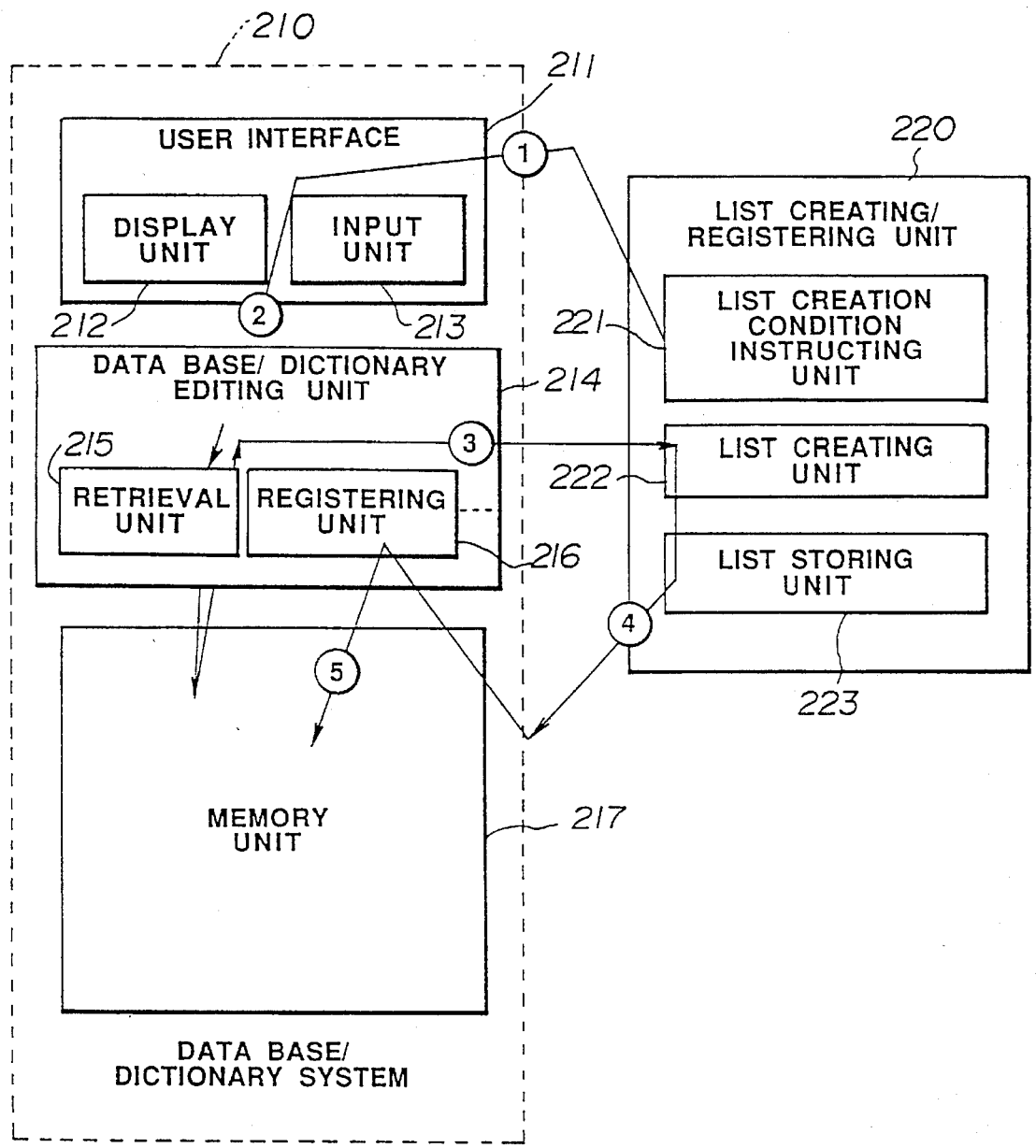
FIG. 15 shows a relationship between the data base/dictionary system and list creating/registering unit at the time of creating a list.

Shown in FIG. 15 is a relationship between the data base/dictionary system and the list creating/registering unit when a list is created, in which parts having the same functions as those in FIG. 12 are denoted by the same reference numerals and reference symbols ① to ⑤ indicate the processing order.

Figure 16:
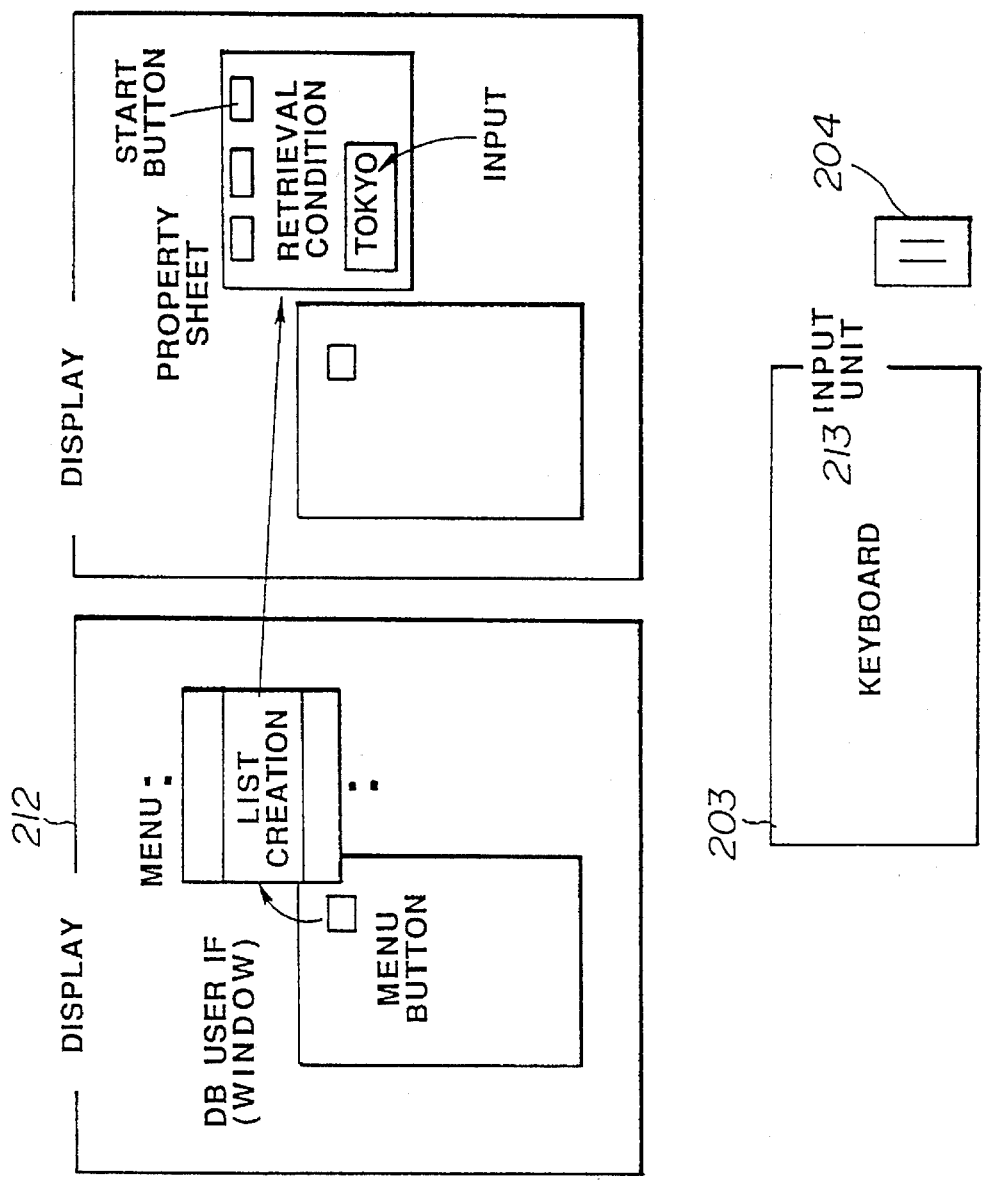
FIG. 16 shows interfaces on the display screen of a list creation condition instructing unit.

The list creation condition instructing unit 221, as shown in FIG. 16, opens another special window (such as a property sheet) through such a special instructing unit as a menu on the display screen of the display unit 212 to set user's creation conditions (①, ②). In an example of FIG. 16, the user instructs to list up all the titles of data having the retrieval key 'Tokyo'. 'Tokyo' is set through the keyboard 203 or mouse 204 of the input unit 213 to be transcribed from another display area. As an example of setting the creation conditions, no special retrieval key is designated and designation is made either one of title and retrieval key always with respect to all data, or designation is made to start list creation of title or retrieval key at the stage of instructing (a menu) prior to opening the special window.

The list creating unit 222 actually performs its retrieving operation in such conditions as set by the list creation condition instructing unit 221 and sequentially links together titles of the resultant data obtained through the retrieving operation to create a list as a text (③). The retrieving operation is carried out over the data memory unit 217 by means of the retrieval unit 215. Methods for linking titles include, for example as shown in FIG. 17, a method in which up to 4 titles are linked by tabs to form a 4-title character string and a plurality of such 4-title character strings are linked by carriage returns. However, it will be appreciated that this method may be modified according to the specifications of the user interface 211, in particular, the display unit 213. In other words, titles may be linked simply by carriage returns in a row. Further, the list creating procedure may be designed to sequentially display the list on display unit 212.

When all the titles are listed up, the resultant title list is made to be an independent text. Or the resultant list is stored in the data base or electronic dictionary as a data body (which will be referred to as "LIST", hereinafter). A character string 'Tokyo-list' is given as a title to the LIST. This corresponds to the case where a character string 'list' is linked to a retrieval key (which will be referred to as "ORGKEY", hereinafter, and in this example, 'Tokyo') instructed by the user through the list creation condition instructing unit 221 to create the list. When ORGKEY is null, that is, when the retrieving operation is for all the data, the list becomes merely 'list'. This title creating method may be realized by another suitable method for convenience of applications. When another character string can be set for a retrieval key item to retrieve LIST, for example, ORGKEY itself ('Tokyo' in this example) may be arranged to be automatically added. Further, in order to imply LIST, a character string 'list' may be added to the retrieval keys. With such an arrangement, LIST can be conveniently retrieved even by any of the retrieval keys 'Tokyo' and 'list' or even by a logical expression including these.

The list storing unit 223 actually stores the obtained LIST into the data memory unit 217 through the registering unit 216 of the data base/dictionary editing unit 214 (④, ⑤). In this connection, finally, the LIST may be automatically retrieved to be displayed.

Explanation has been made as to the case where a list of the retrieved data is created in the present embodiment, but for such a data base or electronic dictionary that a plurality of keywords for retrieval for each data can be set, such retrieval keywords may be also made in the form of a list. This case is substantially the same as when the 'title' in the foregoing embodiment is replaced by the word 'keyword' and thus explanation thereof is omitted.

Further, the data management system in accordance with the present invention can be applied to general data bases including electronic dictionaries.

In this way, in the data management system of the present invention, since data base retrieval is carried out with use of titles or retrieval keys and the titles or keywords attached to the retrieved data are arranged in a predetermined list format, data titles or retrieval keywords can be obtained in the form of a list in the editing procedure of general data bases including electronic dictionaries. Accordingly, when such a list is managed as one data in the corresponding data base as in other data, it can be handled as an independent accessible one. In this case, the user can confirm as necessary the then stage where the current data base or electronic dictionary is inputted or edited, whereby its editing efficiency can be remarkably improved.

In this case, such a troublesome procedure as to set a special operation for list handling can be eliminated. Further, when it is desired to again make reference to the once-created list, since the list can be extracted through substantially the same procedure as the retrieving procedure of other data again and again as necessary, comprehensive survey of data can be facilitated. In addition, these functions can be applied also to history management or the like.

Next, a data retriever as a fourth embodiment of the data management system will be detailed by referring to the drawings.

Figure 18:
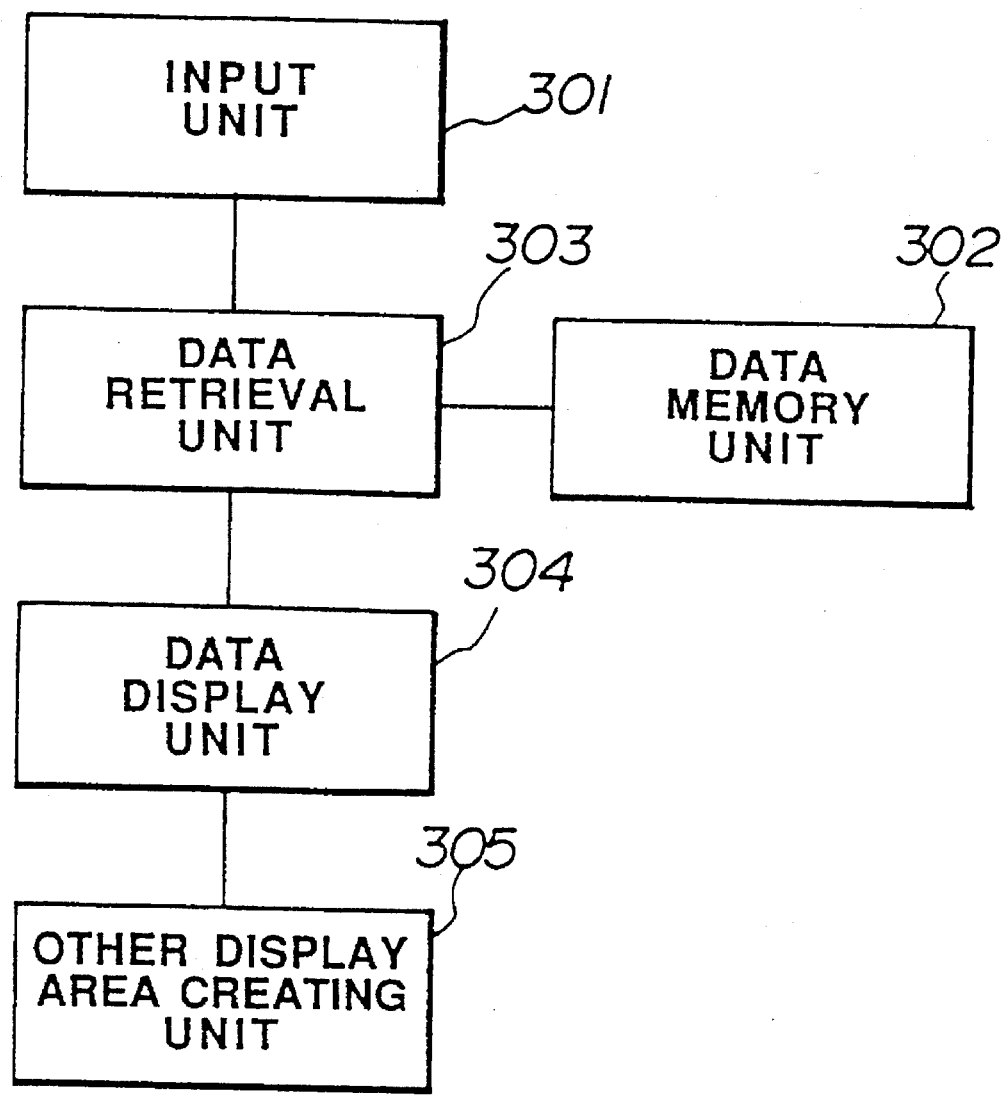
FIG. 18 shows a functional block diagram of a schematic arrangement of a data retriever.

Referring to FIG. 18, there is shown a functional block diagram of a schematic arrangement of the data retriever, which comprises an input unit 301, a data memory unit 302, a data retrieval unit 303, a data display unit 304 and an other display area creating unit 305.

More specifically, the input unit 301, which comprises, e.g., a keyboard, enters a character string on data to be retrieved therethrough. Such input may be replaced by selecting character strings displayed on another display area with use of such a pointing device as a mouse.

The data memory unit 302 stores therein a lot of data. The data memory unit 302 may have any structure so long as it can store such data as a magnetic disk. Further, any data including texts in Japanese and English, pictures and graphics may be used so long as the data can be displayed on the display screen.

The data retrieval unit 303 retrieves desired data from the data memory unit 302. The retrieving method may be realized in various ways, for example, by the retrieval based on the keyword or based on character string matching. These can be easily realized by using such a known retrieval technique as in data base.

The data display unit 304 comprises a display unit for displaying thereon the data retrieved by the data retrieval unit 303. In the present embodiment, the display screen is used as divided into two of a candidate display area and a result display area.

The other display area creating unit 305 creates a display area different from the display area provided by the data display unit 304 and displays the same data as the data displayed on the display area provided by the data display unit 304. In the present embodiment, explanation will be made as to an example where the same data as the data displayed on the result display area is displayed.

The user interfaces on the display screen of the data retriever are illustrated in the form of icons (not shown) when not used so that, when the user instructs desired one of the icons with use of the mouse, the icon is opened so that the data retriever is put in its usable condition.

Figure 19:
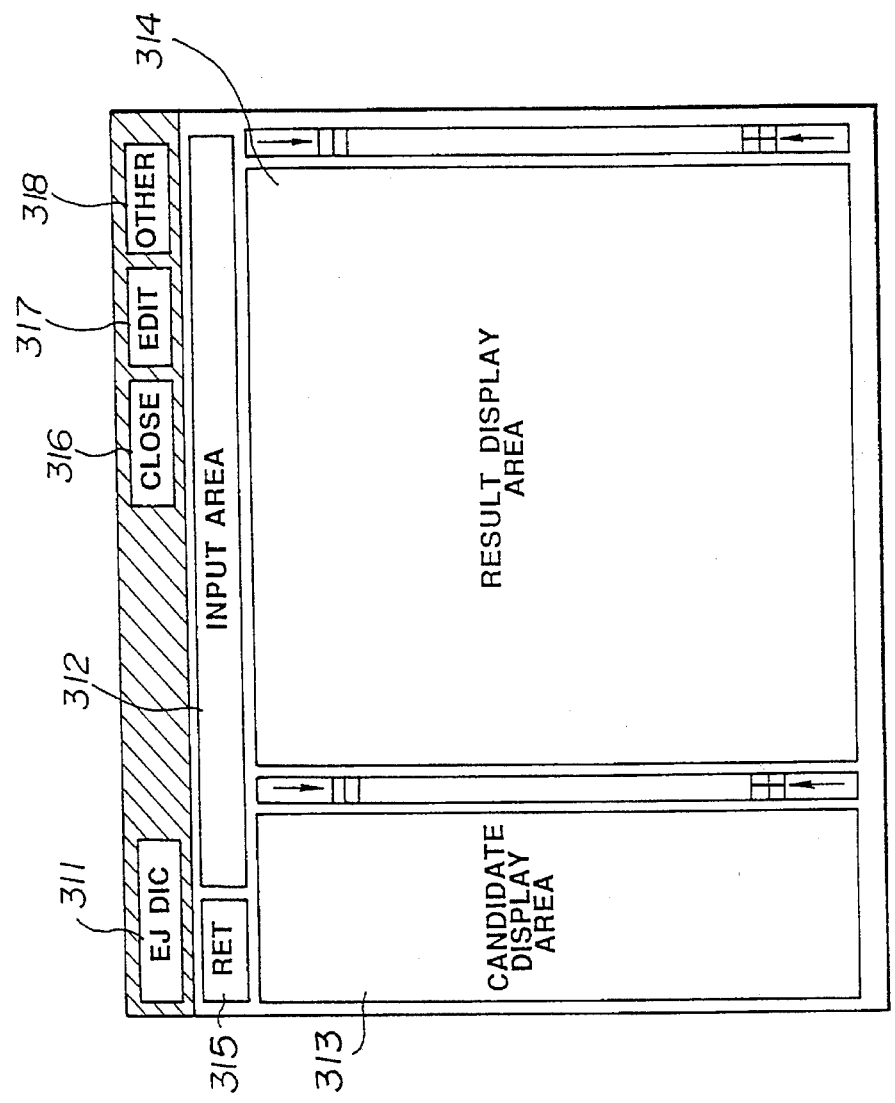
FIG. 19 is a user interface on the display of a data retriever of an English-Japanese dictionary data.

FIG. 19 illustrates a user interface on the display of the data retriever for an English-Japanese dictionary when the icon is opened. In FIG. 19, reference numeral 311 denotes a data retriever name indicative of the contents of data to be retrieved (in this case, English-Japanese dictionary "EJ DIC"), numeral 312 denotes an input area for input of a character string for a retrieval key, numeral 313 denotes a candidate display area for display of the title, etc. of the retrieved data, numeral 314 denotes a result display area for display of the title and content of the retrieved data, numeral 315 denotes a retrieval button "RET" for instructing the start of the retrieving operation, and numeral 316 denotes an end button "CLOSE". When the user specifies the end button "CLOSE" 316 with use of the mouse or the like, this causes the data retriever to terminate all the processing and return to its icon state. Numeral 317 denotes an edit button "EDIT" for change-over to an edit mode, numeral 318 denotes an other display button "OTHER" for creating another display area and displaying thereon the same data as the data displayed on the result display area.

Figure 20:
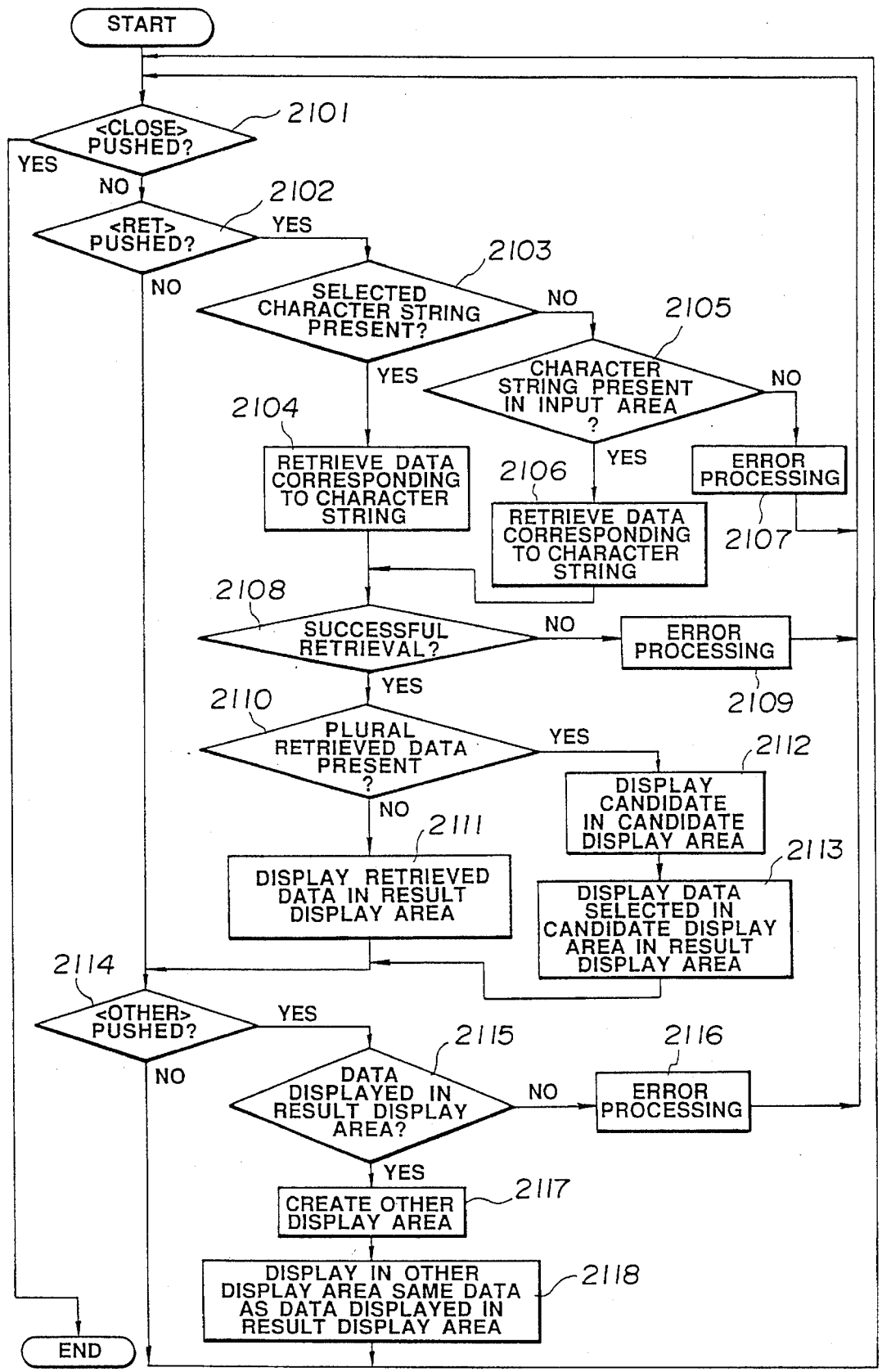
FIG. 20 is a flowchart for explaining the processing procedure of the data retriever when data retrieval and creation of another display area are carried out.

Explanation will next be made as to the processing procedure of the data retriever when performing its data retrieving operation and creating another display area by referring to a flowchart of FIG. 20 and also to FIGS. 21 to 26.

In such a condition that the button 'CLOSE' is not pushed (step 2101), when the user pushes the button 'RET' (step 2102), this causes the data retrieval unit 303 to start the data retrieving operation.

When the 'RET' button is pushed, if there is a character string selected by such a pointing device as the mouse (step 2103), then data on the selected character string is retrieved from the data memory unit 302 (step 2104). The absence of the selected character string and the presence of a character string in the input area (step 2105) cause data on the input character string to be retrieved from the data memory 302 (step 2106). Further, the absence of any character strings in the input area causes to perform its error processing operation (step 2107).

Shown in FIG. 21 are exemplary contents of part of the data already stored in the data memory unit 302. In the illustrated embodiment, the contents of the English-Japanese dictionary are stored in the data memory unit 302. The data retrieval unit 303 retrieves desired data from the data memory unit 302, for example, by a hashing or the like.

The data retrieval unit 303 judges the retrieval result (step 2108) and when the retrieval is not successful, performs its error processing operation (step 2109). When the retrieval is successful, the data retrieval unit 303 judges whether or not there are a plurality of retrieved data (step 2110). The determination of the single retrieved data causes the data retrieval unit 303 to display the name of the single data in the candidate display area and also display the data in the result display area (step 2111). When there are a plurality of retrieved data, the names of these data are displayed in the candidate area (step 2112) while the data selected in the candidate display area is displayed in the result display area (step 2113).

Figure 22:
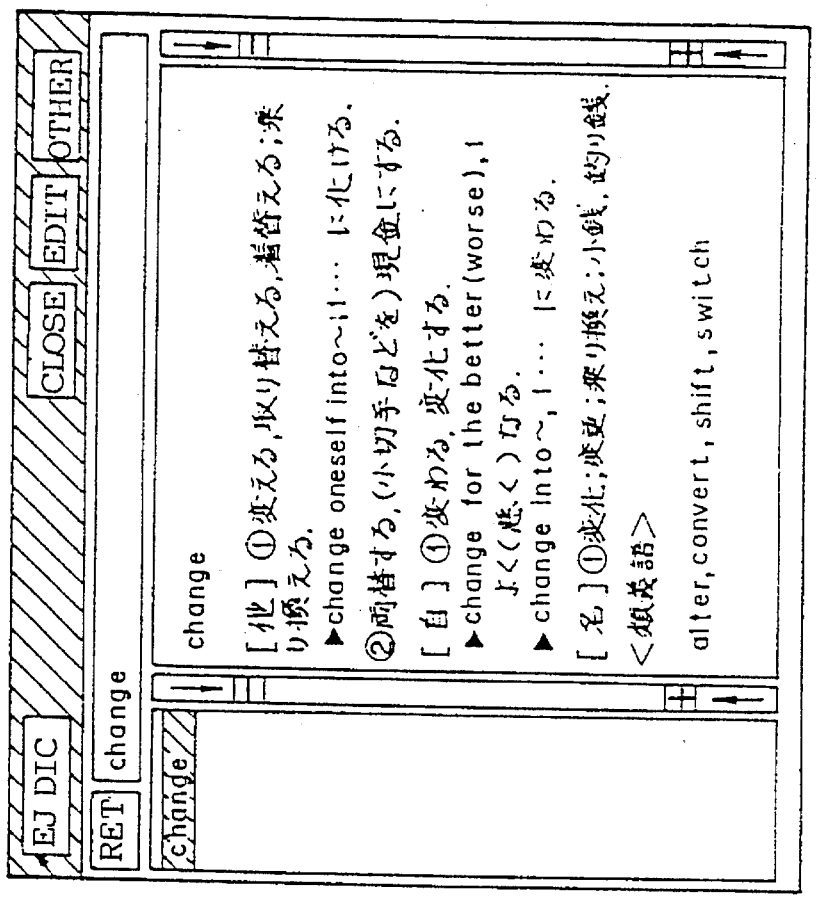
FIG. 22 is an exemplary display of retrieved result when 'change' is entered in an input area and retrieving operation is carried out.

FIG. 22 is an example of the retrieved result when 'change' is entered in the input area for retrieval. In this example, since there is only one data corresponding to 'change' in the data memory unit 302, the one data is retrieved and displayed in the candidate display area as 'change' and its content is displayed in the result display area.

Figure 23:
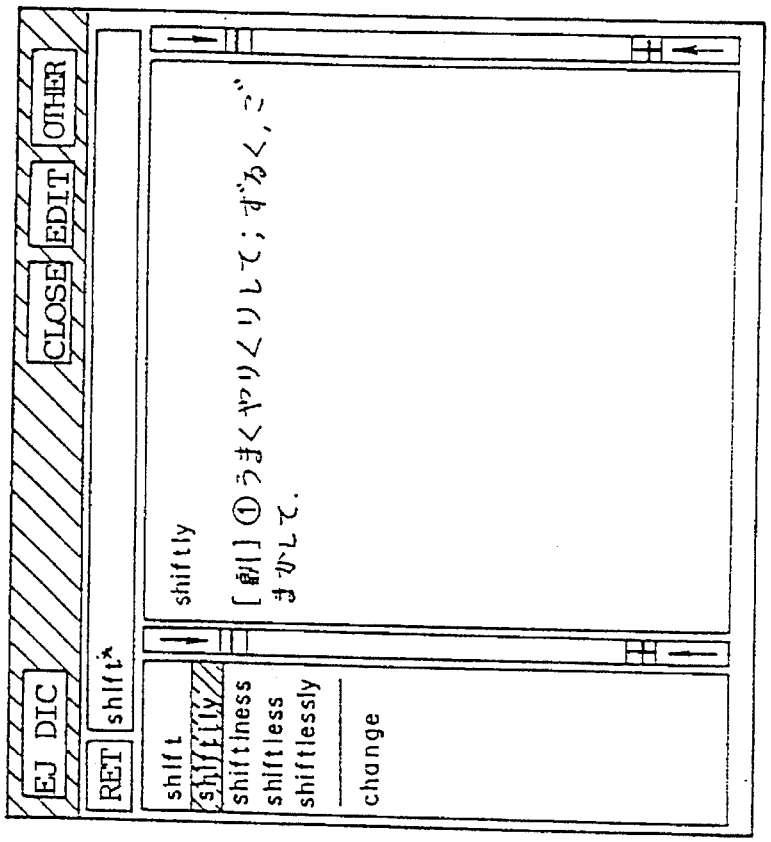
FIG. 23 is an exemplary display of retrieved result when 'shift*' is entered in the input area and retrieving operation is carried out.

FIG. 23 is an example of the retrieved result when 'shift×' is entered in the input area for retrieval. In this case, all the data containing 'shift' at the beginning of a character string are retrieved. In the illustrated example, data 'shift', 'shiftily', 'shiftiness', 'shiftless' and 'shiftlessly' are retrieved and these names are displayed in the candidate display area. Thereafter, since 'shiftily' is selected (indicated by hatching in the illustrated example), the contents of 'shiftily' are displayed in the result display area. The above retrieving operations can be realized by a known technique.

Next, pushing the "OTHER" button (step 2114) causes the other display area creating unit 305 to judge whether or not data is displayed in the result display area(step 2115). The absence of data causes to perform its error processing operation (step 2116). The presence of data causes the unit 305 to create another display area (step 2117) and display therein the same data as the data displayed in the result display area (step 2118).

Figure 24:
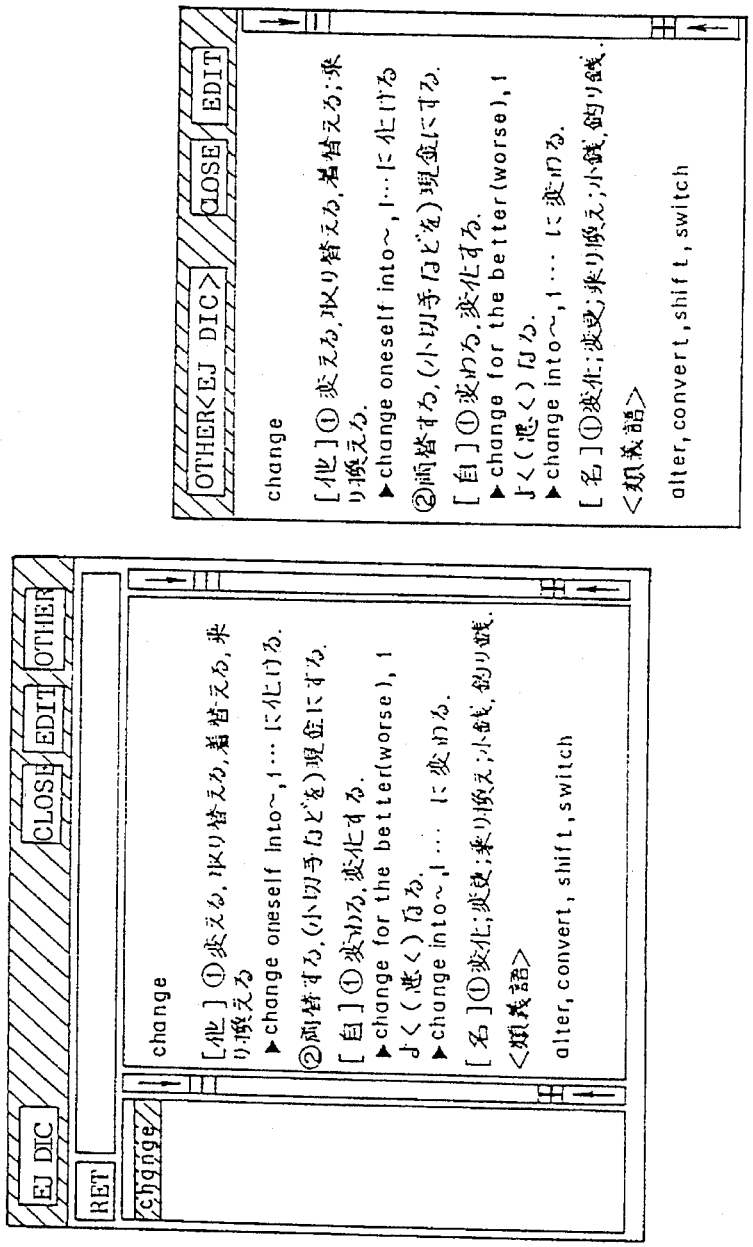
FIG. 24 is an exemplary display of a result when 'change' is entered into the input area for its retrieval and generation of a other display area is instructed.
Figure 25:
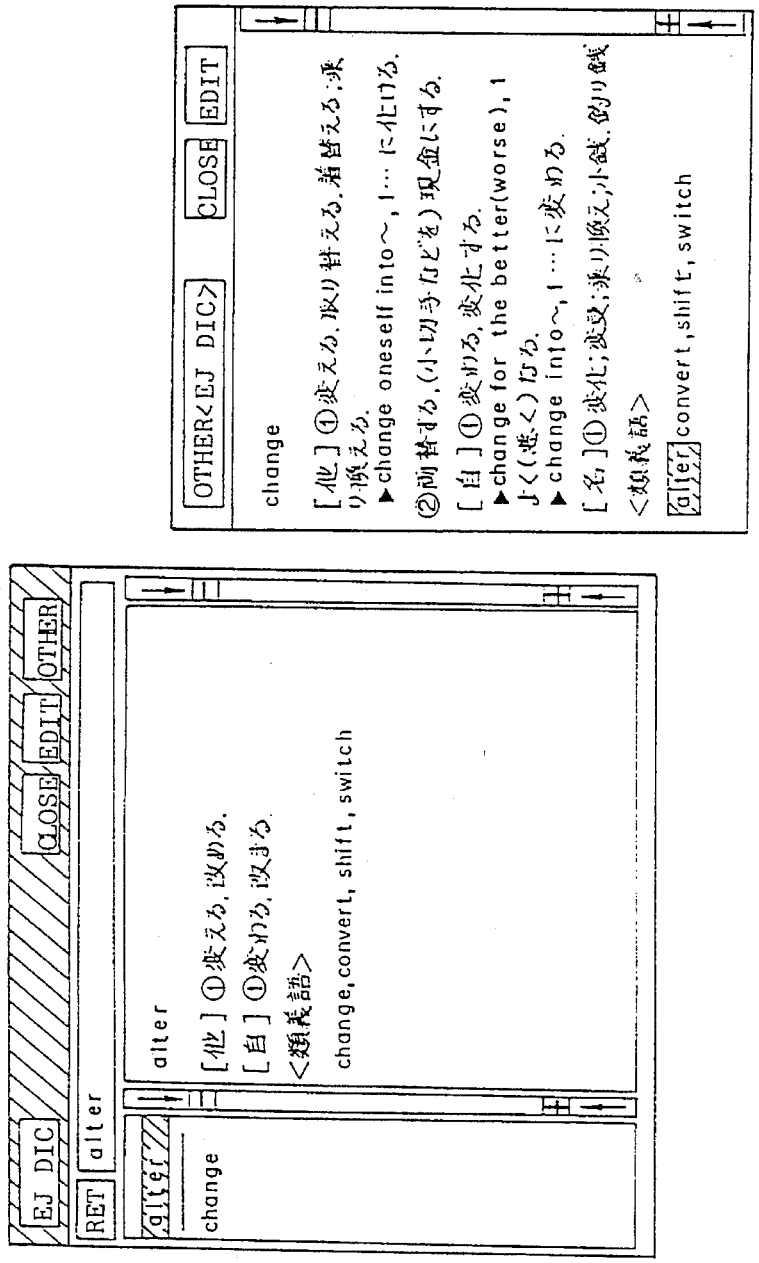
FIG. 25 is an exemplary display of a result when a character string 'alter' is selected in the other display area for its retrieval.

The size of the created display area is the same as that of the result display area and the data displayed in the result display area is copied and displayed in the created display area. FIG. 24 is an example of the result when 'change' is entered in the input area for retrieval and other display area creation is instructed. The created other display area may be located at an arbitrary location on the display screen. The number of other display areas to be created displaying for the same data is not limited. In the created other display area, the user can freely select a character string with use of such a pointing device as the mouse. FIG. 25 shows a result when the user selects 'alter' in "Synonyms" in the other display area from the display of FIG. 24. In FIG. 25, the retrieved result of 'alter' is displayed on the data retriever of the English-Japanese dictionary.

Figure 26:
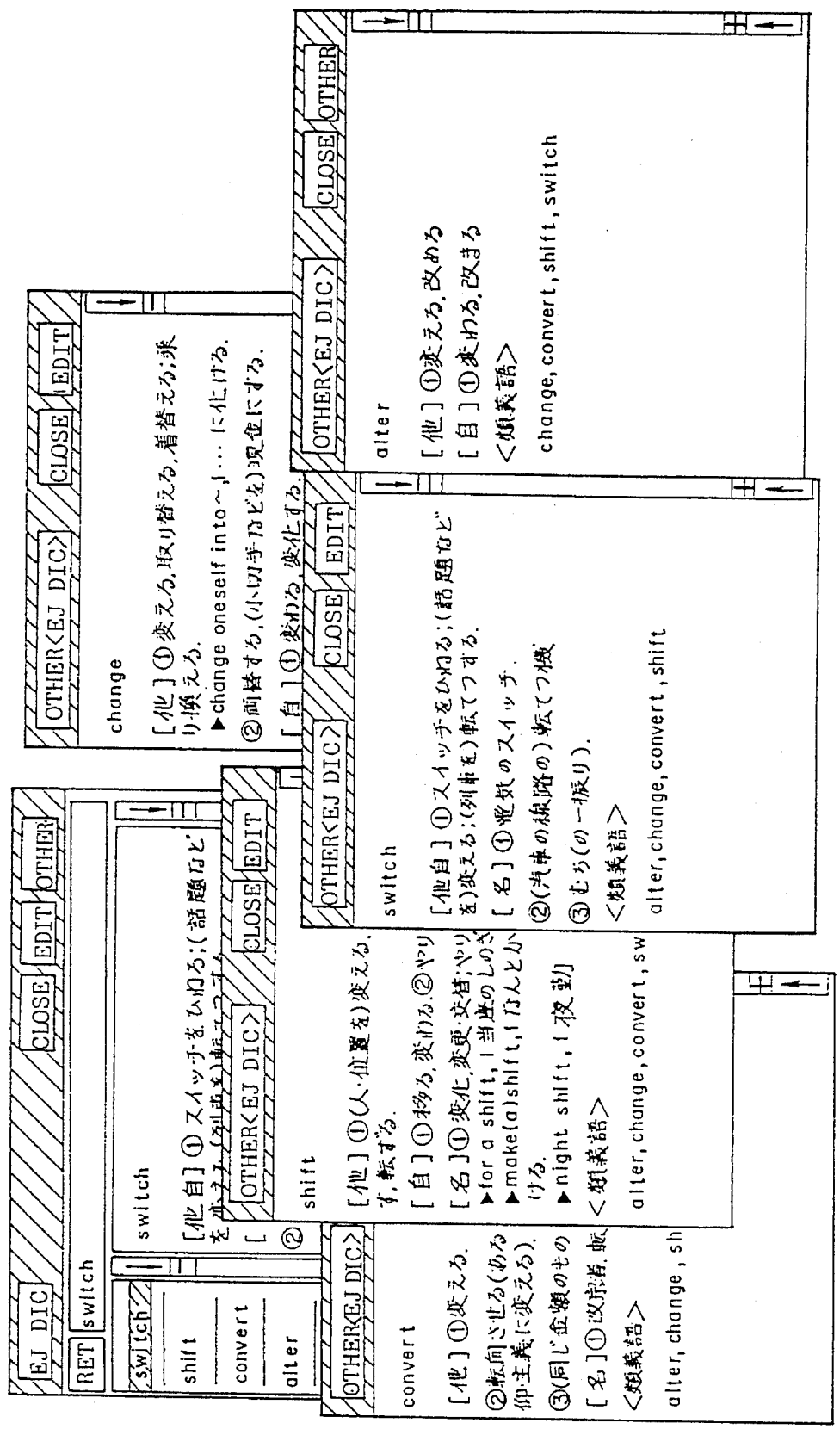
FIG. 26 is an exemplary display of a result when a plurality of different display areas are created.

Shown in FIG. 26 is an example of the result when another display area is further created for the retrieved result of 'alter', remaining three words 'convert', 'shift' and 'switch' shown as synonyms of 'change' are sequentially selected for retrieval, and another display areas are also created for the retrieved results thereof.

Through the above processing operations, the data of the four words 'alter', 'convert', 'shift' and 'switch' as synonyms of 'change' are retrieved and these retrieved data are displayed on the same display screen at the same time for mutual comparison.

Figure 27:
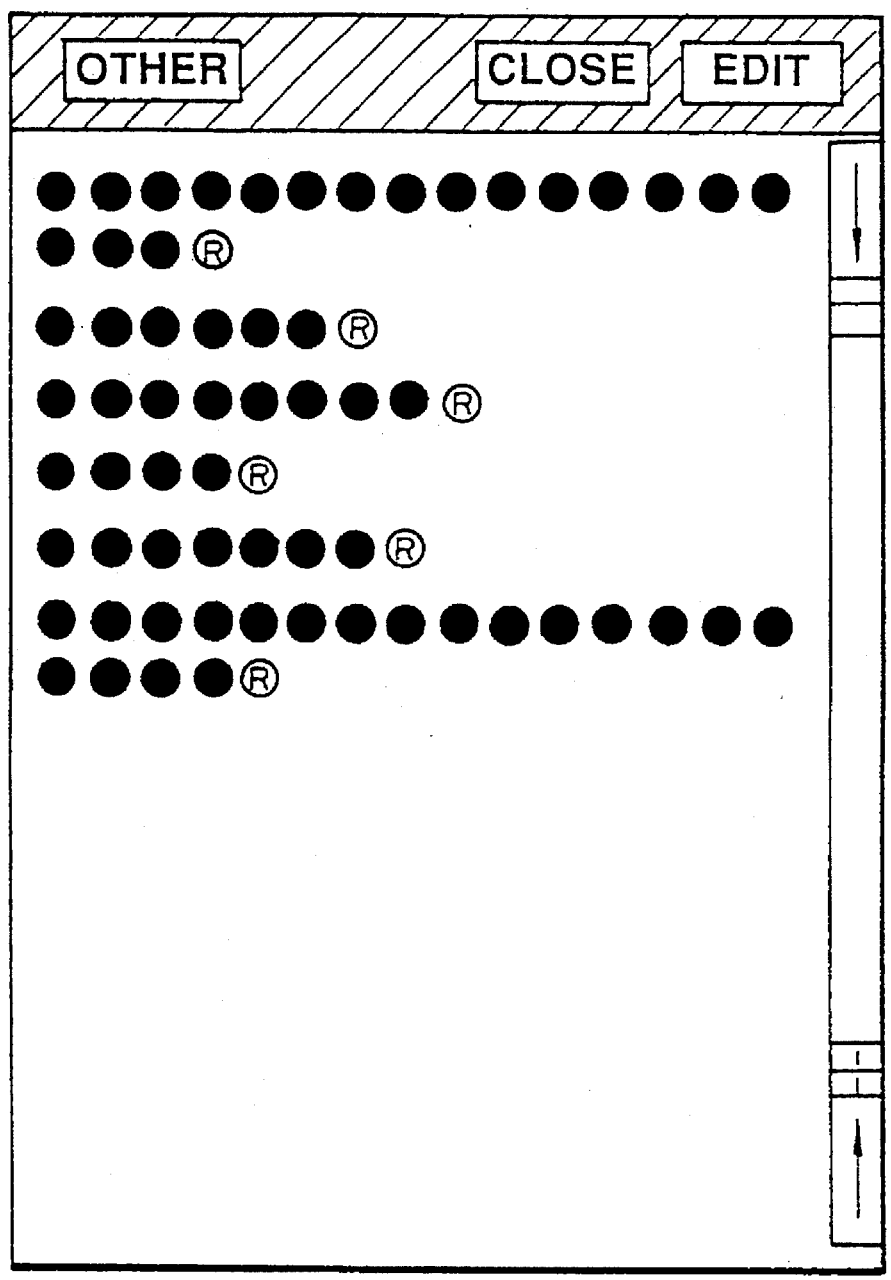
FIG. 27 is an original diagram for explaining how to create another display area having a minimum size.
Figure 28:
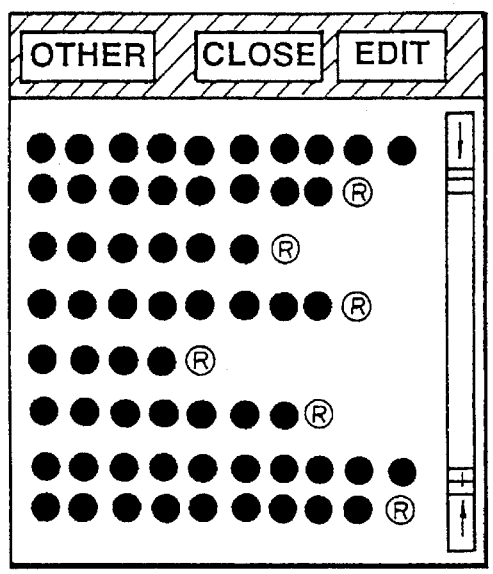
FIG. 28 is a diagram when the display area shown in FIG. 27 has a minimum size.
Figure 29:
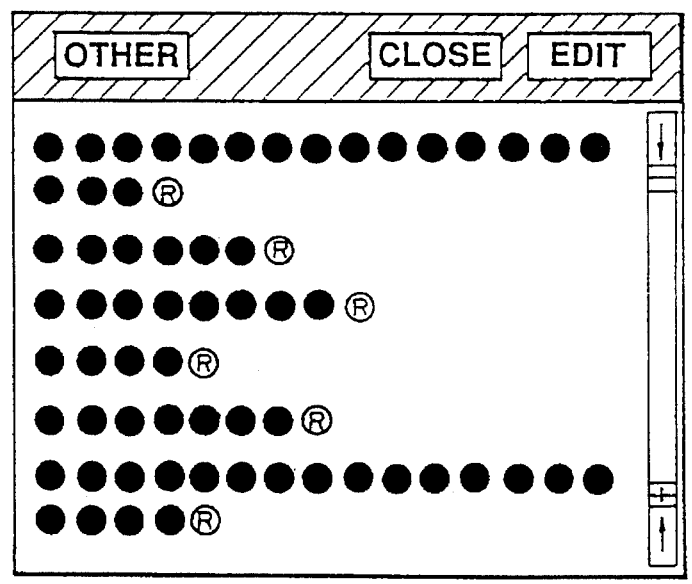
FIG. 29 is a diagram when the display area shown in FIG. 27 has a minimum size according to a method different from a method of FIG. 28.
Figure 30:
FIG. 30 is an exemplary display of a result when other display areas having a minimum size according to the method of FIG. 29 is created.

The other display area creating unit 305 can also create another display area having the minimum size displayable on the data display unit 304. In this case, a blank part unnecessary for data display can be reduced and many other display areas can be efficiently displayed. As a method for creating other display area having the minimum size, for example, the maximum horizontal dimension of the other display area is set to coincide with the maximum line length where no carriage return occurs while considering the horizontal dimension of the result display area as the maximum length, and the vertical dimension is set to coincide with the lower end of the lowermost line. Examples of the other display areas having the minimum size according to the above method are shown in FIGS. 27 and 28. In the drawings, mark '●' represents a letter and mark 'Ⓡ' represents a carriage return. FIG. 28 corresponds to the minimum of the display area of FIG. 27. In another method for creating other display area having the minimum size, the horizontal dimension of the other display area is set to be the same as the horizontal dimension of the result display area and the vertical dimension thereof is set to coincide with the lower end of the lowermost line. FIG. 29 corresponds to the minimum of the display area of FIG. 27 according to this method. FIG. 30 shows an example of the display area of FIG. 26 when other display areas having the minimum size are created according to the latter method. When the other display areas are positioned as shown in FIG. 30, the user can see a plurality of data at the same time and can easily compare these data. Since these other display areas can be freely modified to a desired size by the user after once displayed, the size and position can be modified to display only the further necessary part. For each of the other display areas, pushing the "CLOSE" button causes the area to be closed. Pushing the "CLOSE" button of the data retriever itself causes all the other display areas and data display area so far created to be all closed, thus completion its processing operation.

Another embodiment of the data retriever will next be detailed by referring to the drawings.

Figure 31:
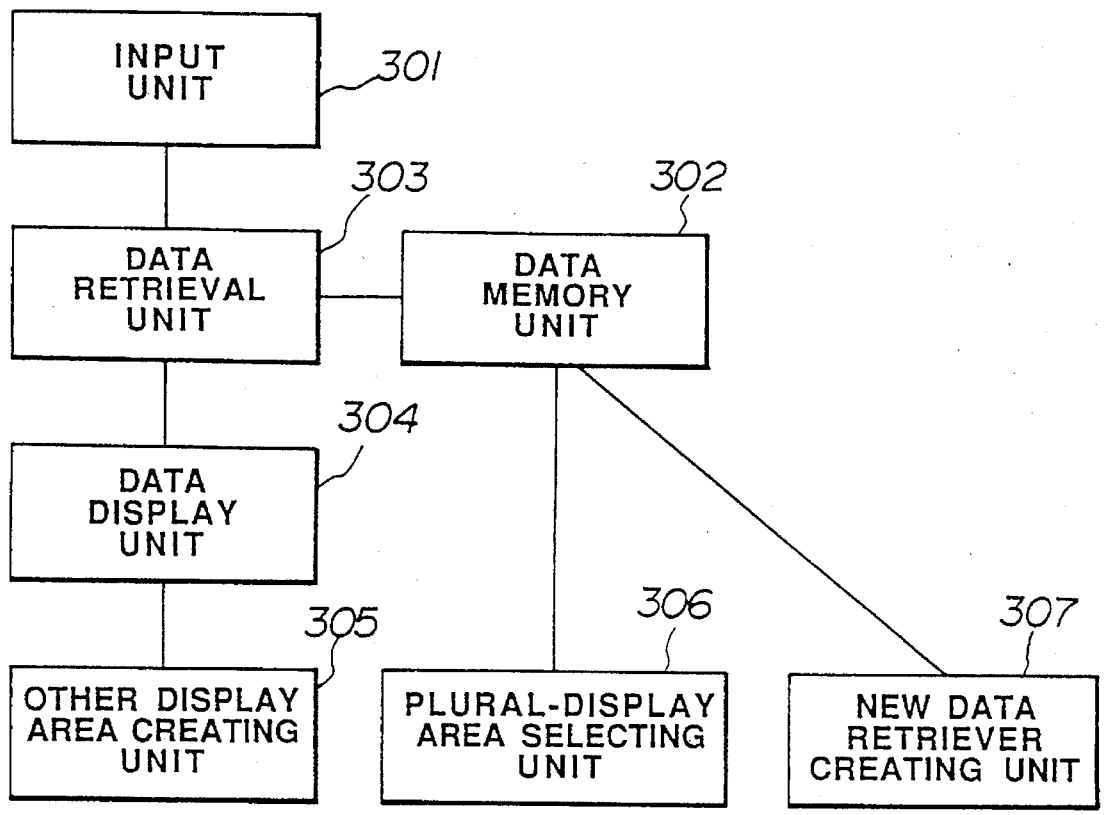
FIG. 31 is a functional block diagram of a schematic arrangement of another data retriever in the data retrieval system.

Referring to FIG. 31, there is shown a functional block diagram of a schematic arrangement of the data retriever of the embodiment, which comprises a plural-display area selecting unit 306 and a new data retriever creating unit 307, in addition to the aforementioned input unit 301, data memory unit 302, data retrieval unit 303, data display unit 304 and other display area creating unit 305 which structures are substantially the same as those in FIG. 18.

The plural-display area selecting unit 306 stores therein the display areas selected by the user and also manages the selected display areas, e.g., by displaying the selected display areas as distinguished from the display areas not selected.

The new data retriever creating unit 307 combines more than one data displayed on more than one different display areas under management of the plural-display area selecting unit 306 to create a new data retriever.

Figure 32:
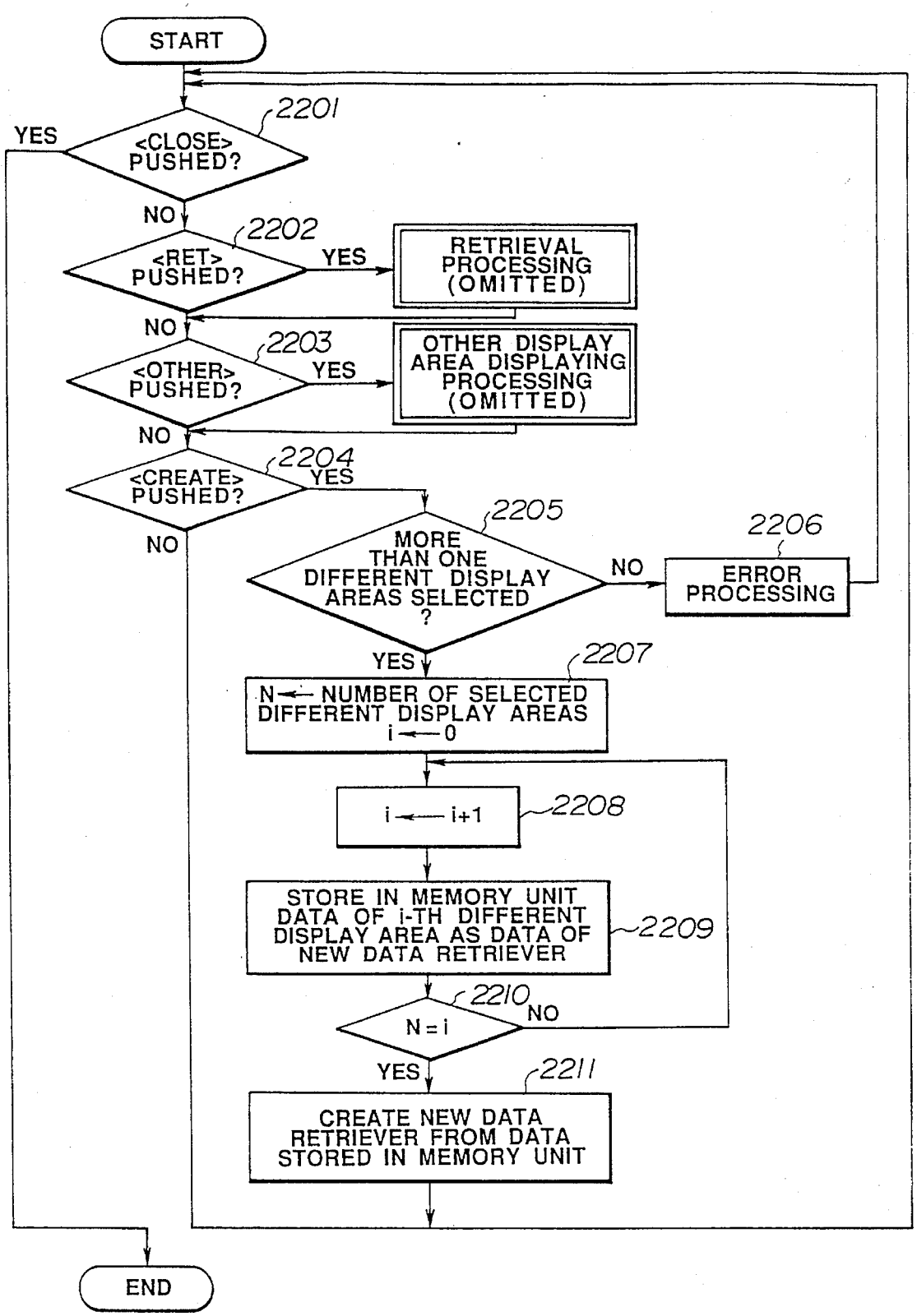
FIG. 32 is a flowchart for explaining the processing procedure of the data retriever when a new data retriever is created from the data displayed in the other display area.

Next, the processing procedure of the data retriever when a new data retriever is created on the basis of the data displayed on different display areas will be explained by referring to a flowchart of FIG. 32 and also to FIGS. 33 through 36. In FIG. 32, the retrieval operation part and the other display area displaying operation part are the same as the counterparts in FIG. 20 and thus explanation thereof is omitted (step 2201 to 2203).

First of all, the user selects a desired display area by clicking an end part of the desired display area with use of such a pointing device as the mouse. When the user pushes the "CREATE" button (step 2204), the plural-display area selecting unit 306 judges whether or not-more than one different display areas are selected (step 2205). When more than one different display areas are not selected, the data retriever performs its error processing operation (step 2206). When more than one different display areas are selected, this effect is informed to the new data retriever creating unit 307. The new data retriever creating unit 307 sets the number of the selected different display areas to be N and also i to be 0 (step 2207). Subsequently, the unit 307 sets (i+1) to be i (step 2208) and stores the data of the i-th other display area into the data memory unit 302 as new data for the data retriever (step 2209). Similarly, the above processing of the steps 2208 and 2209 are repeated until N=i (step 2210). When a relationship of N=i is satisfied, the data stored in the data memory unit 302 are integrated to create the data retriever (step 2211).

Figure 33:
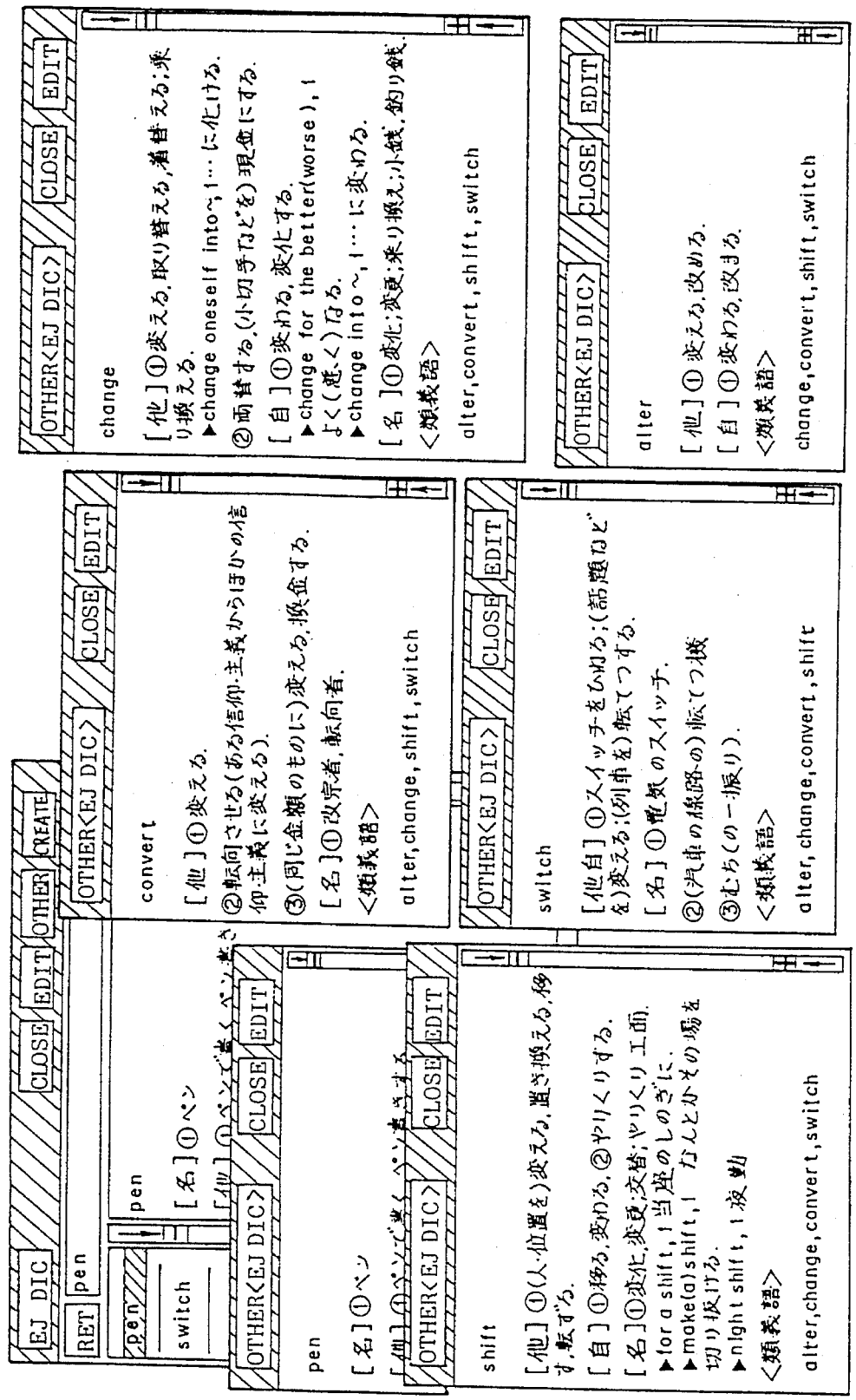
FIG. 33 shows a screen state before a plurality of other display areas are selected.
Figure 34:
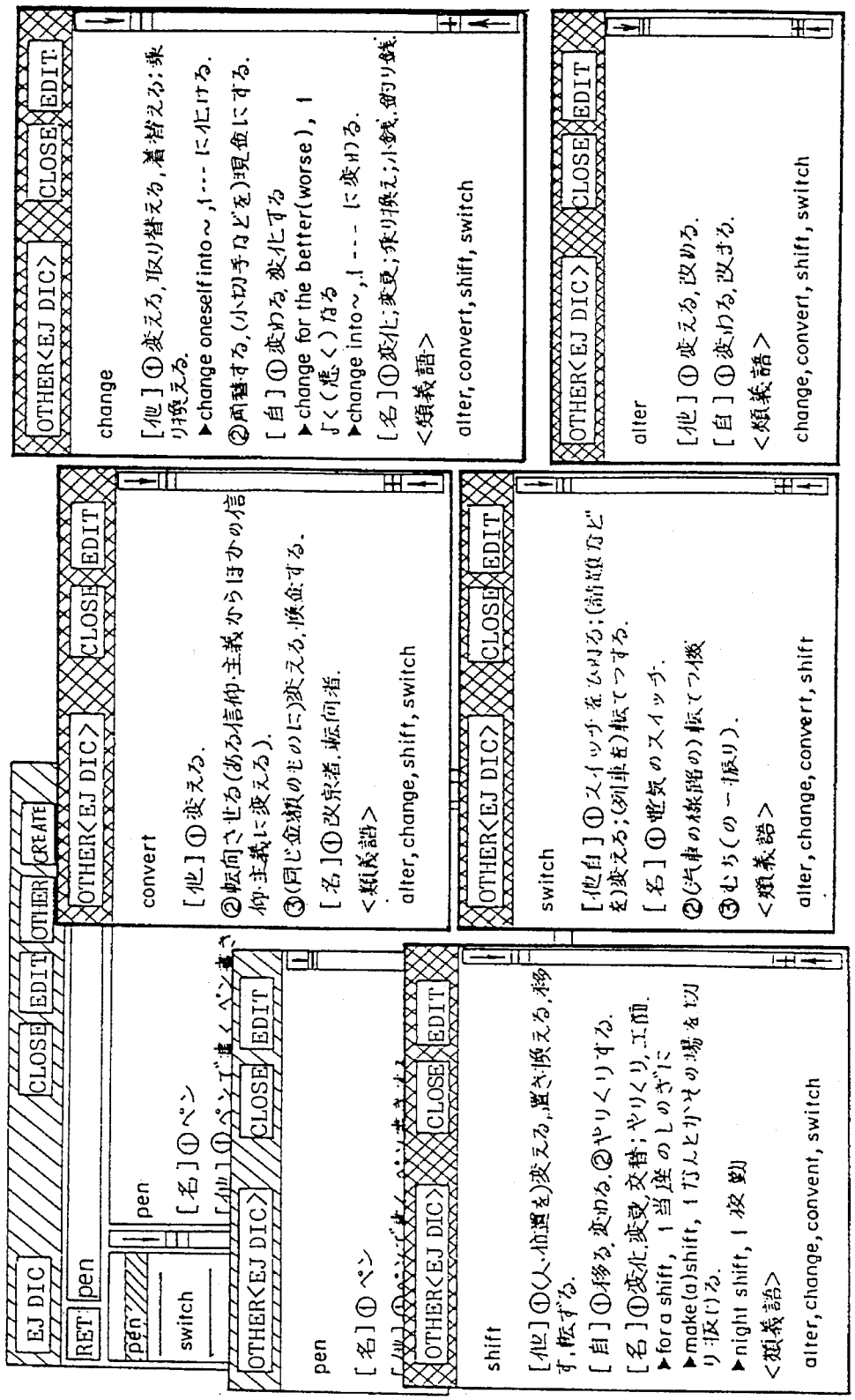
FIG. 34 is an exemplary display of a result when the plurality of different display areas are selected.
Figure 36:
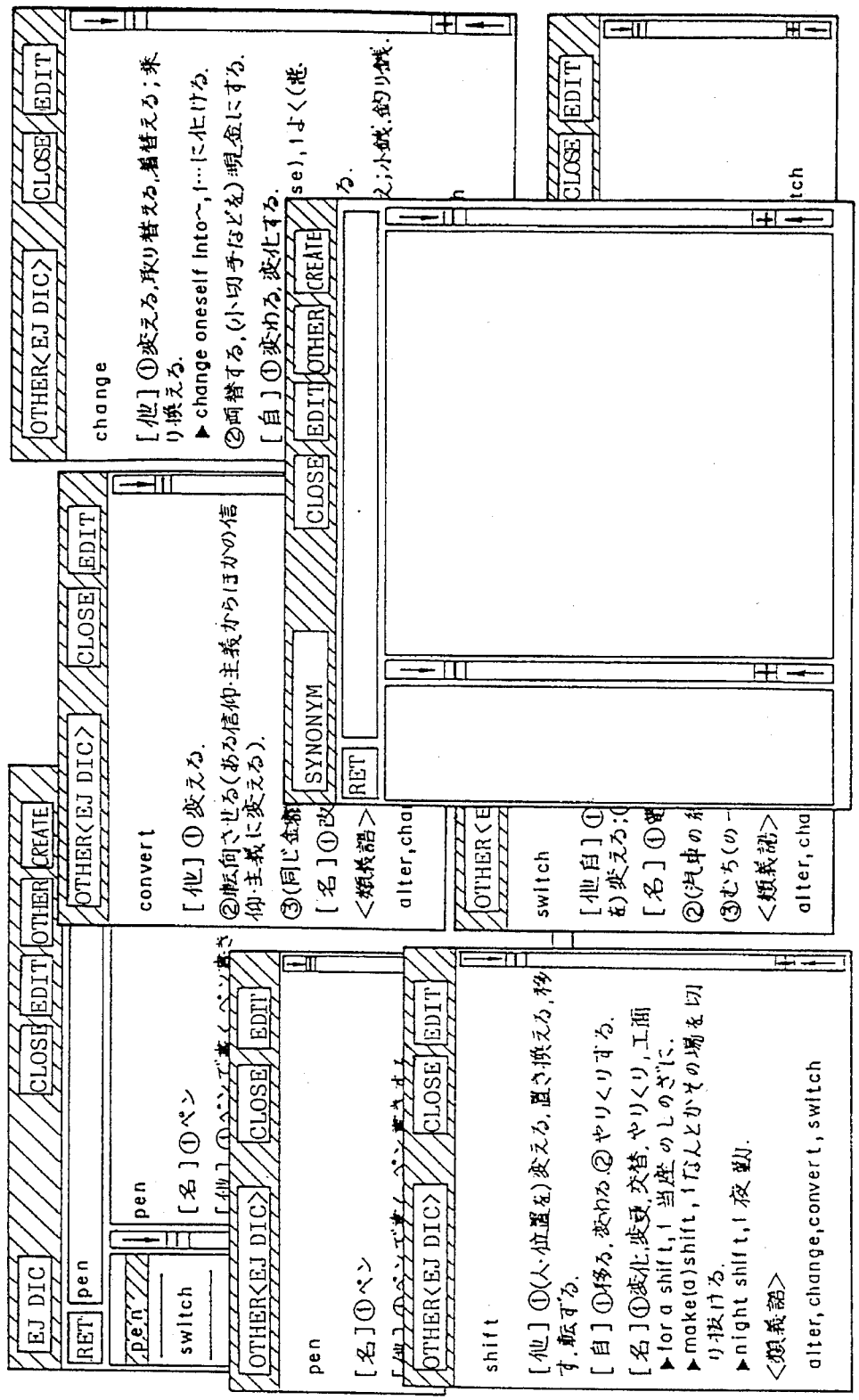
FIG. 36 is an exemplary display when a newly created data retriever having a name 'synonym for change'.

FIG. 33 is an example of the display screen when 6 words 'change', 'alter', 'convert', 'shift', 'switch' and 'pen' are displayed in different display areas. FIG. 34 is an example of the display screen when the 5 words 'change', 'alter', 'convert', 'shift' and 'switch' of these 6 words are selected and displayed in different display areas as synonyms of 'change'. In FIG. 34, the selected 5 other display areas are illustrated by bold lines. The new data retriever creating unit 307 extracts from one of the selected 5 other display areas the data displayed therein. If the 'change' is selected, then the new data retriever creating unit 307 extracts the data of 'change' and stores it in the data memory unit 302 as new data of the data retriever. Similarly, even with respect to the remaining words 'alter', 'convert', 'shift' and 'switch', these data are stores in the data memory unit 302 as new data of the data retriever. Through such processing operations, the plurality of selected retrieval data are integrated within the data memory unit 302. Shown in FIG. 35 is an example of the contents of the new data retriever stored in the data memory 302 after the processing of the FIG. 32 is completed. When a name 'synonym for change' for example is attached to such a data retriever, a data retriever having a name 'synonym for change' and storing therein only the data concerning the 5 words 'change', 'alter', 'convert', 'shift' and switch' is newly created. FIG. 36 is an example of such a new data retriever having the name 'synonym for change'.

In FIG. 36, the other display area, which was used to create the data retriever having the name 'synonym for change', remains as displayed. However, these remaining other display areas may be closed when the new data retriever is created.

In this way, in the aforementioned data retriever, since another display areas different in size from the display area for display of the retrieved data are created and the same data as the data displayed in the display area for the retrieved data are displayed in the created another display area, when the user wishes to make reference to the data later, he can create another display area for displaying data to be referred to. Thus, the user can see a plurality of data at the same time or can compare these data. Further, since character strings in the data of another display areas can be freely selected, when another display areas are previously created, part of the character strings in the previously retrieved data can be selected to be used as a new retrieval key.

Furthermore, since more than one data displayed in more than one display area selected by the user is previously stored and the stored data are integrated to create another data source, such a new data source as the data retriever can be easily created on the basis of the data extracted from a data retriever.

What is claimed is:

1. A data management system comprising:

memory means for storing a plurality of data, each of said data comprising a set of three composing elements of a data body comprising a list of unique records whose data content is not so described that the system is able to handle by hierarchically and logically differentiating it, said composing elements including a data name, data body and keywords, said data name associated with the data body and one or more keywords for retrieval of the data body;

input means for inputting a keyword for retrieval of desired data from the plurality of data stored in the memory means;

retrieval means for retrieving data on the basis of one or more keywords stored in the memory means; and display means for displaying a retrieval result of the retrieval means.

2. A data management system as set forth in claim 1 further comprising designating means, when a plurality of data records are retrieved by the retrieval means, for designating a data record of which data body is to be displayed on the display means on the basis of data names of the plurality of data records displayed on the display means.

3. A data management system as set forth in claim 2, wherein the designating means designates the data record by pointing out the data name of the data record displayed on the display means by means of a pointing device.

4. A data management system as set forth in claim 3, wherein the pointing device comprises a mouse.

5. A data management system as set forth in claim 2, wherein the display means includes a first area for displaying as a list at least one data name of the one or more data records retrieved from the memory means by the retrieval operation and a second area for displaying contents of the data body of the data record designated by the designating means among the data records displayed in the first area.

6. A data management system as set forth in claim 5, wherein the display means further includes a third area for displaying the retrieval word entered through the input means.

7. A data management system as set forth in claim 1 further comprising editing means for editing the data stored in the memory means, wherein a user interface of the editing means is provided with three individual areas for inputting and displaying the data name, the data body, and the keywords for data retrieval, respectively.

8. A data management system as set forth in claim 7, wherein the editing means comprises automatic register means for automatically registering data names as keywords to be matched with the retrieval word.

9. A data management system as set forth in claim 1 further comprising additional display area creating means for creating one or more additional display areas to display data including at least part of the retrieval result of the retrieval means which has been displayed in a display area, display contents in the one or more additional display areas being independent of subsequent modification to display contents in the display area.

10. A data management system as set forth in claim 9 further comprising plural-display area selecting means for managing the one or more additional display areas created by the additional display area creating means and additional data retrieval means for retrieving with a retrieval data comprised of data displayed on the additional display areas managed by the plural-display area selecting means.

11. A data management system as set forth claim 1 further comprising first list creating means for creating a list of at least one of the data names of the data records retrieved by the retrieval means and the keyword attached to the data record.

12. A data management system as set forth in claim 11 further comprising second list creating means for storing the list created by the first list creating means into the memory means as data.

13. A data management system comprising:

memory means for storing a plurality of said data each comprising a data body, said data body including a list of unique records, whose data content is not so described that the system is able to handle by hierarchically and logically differentiating it a data name associated with the data body and one or more keywords for retrieval of the data body;

input means for inputting a keyword for retrieval of desired data from the plurality of data stored in the memory means;

retrieval means for retrieving data on the basis of one or more keywords stored in the memory means; and display means for displaying said data retrieved by the retrieval means, wherein the display means includes a first area for displaying the retrieval word entered by the input means, a second area for displaying data names of said data retrieved by the retrieval means as a list and a third area for displaying the data body associated of one of with the data names displayed in the second area.

* * * * *